(12) United States Patent
Suzuki et al.

(10) Patent No.: US 11,668,822 B2
(45) Date of Patent: *Jun. 6, 2023

(54) UNDERWATER DETECTION APPARATUS AND UNDERWATER DETECTION METHOD

(71) Applicant: FURUNO ELECTRIC CO., LTD., Nishinomiya (JP)

(72) Inventors: Nobuo Suzuki, Kobe (JP); Kohei Kozuki, Kariya (JP); Takeshi Kawajiri, Takarazuka (JP); Yuji Ebita, Settsu (JP)

(73) Assignee: FURUNO ELECTRIC COMPANY LIMITED, Nishinomiya (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/046,712

(22) Filed: Oct. 14, 2022

(65) Prior Publication Data

US 2023/0063174 A1  Mar. 2, 2023

Related U.S. Application Data

(63) Continuation of application No. 16/846,088, filed on Apr. 10, 2020, now Pat. No. 11,513,217.

(30) Foreign Application Priority Data

May 21, 2019 (JP) ................. 2019-095204

(51) Int. Cl.
 *G01S 15/89* (2006.01)
 *G01S 15/96* (2006.01)
 (Continued)

(52) U.S. Cl.
 CPC ...... *G01S 15/8993* (2013.01); *G01S 7/52019* (2013.01); *G01S 7/52023* (2013.01);
 (Continued)

(58) Field of Classification Search
 CPC ............ G01S 15/8993; G01S 7/52019; G01S 7/52023; G01S 15/96; G10K 11/006; G10K 2200/11
 See application file for complete search history.

(56) References Cited

U.S. PATENT DOCUMENTS 3,781,775 A * 12/1973 Malloy ............... G01S 15/8902
 367/173
6,268,833 B1  7/2001 Tanizaki et al.
 (Continued)

FOREIGN PATENT DOCUMENTS

CN  1894598 A  1/2007
EP  3761058 A1  1/2021
 (Continued)

*Primary Examiner* — Daniel Pihulic
(74) *Attorney, Agent, or Firm* — Studebaker & Brackett PC

(57) ABSTRACT

An underwater detection apparatus is provided which includes a transmission transducer, a reception transducer, and a motor. The transmission transducer transmits a transmission wave within a given fan-shaped transmission space, the fan-shaped transmission space having a first transmission width in a given first plane and a second transmission width in a second plane perpendicular to the first plane. The reception transducer receives, as a reception wave, a reflection wave of the transmission wave within a given fan-shaped reception space, the fan-shaped reception space having a first reception width in the first plane and a second reception width in the second plane, the second reception width being wider than the second transmission width, and in the second plane, the fan-shaped transmission space being within the fan-shaped reception space. The motor rotates the fan-shaped transmission space and the fan-shaped reception space.

18 Claims, 22 Drawing Sheets

(51) Int. Cl.
*G01S 7/52* (2006.01)
*G10K 11/00* (2006.01)

(52) U.S. Cl.
CPC ............ *G01S 15/96* (2013.01); *G10K 11/006* (2013.01); *G10K 2200/11* (2013.01)

(56) References Cited

U.S. PATENT DOCUMENTS

| | | |
|---|---|---|
| 6,856,577 B1 | 2/2005 | Handa et al. |
| 9,335,412 B2 | 5/2016 | Proctor |
| 11,513,217 B2* | 11/2022 | Suzuki ................. G10K 11/355 |
| 2014/0269192 A1 | 9/2014 | Proctor |
| 2015/0070208 A1 | 3/2015 | Goto et al. |
| 2016/0131759 A1 | 5/2016 | Kozuki |
| 2016/0131760 A1* | 5/2016 | Kozuki ................... G01S 15/42 |
| | | 367/102 |
| 2016/0377716 A1 | 12/2016 | Proctor et al. |
| 2017/0315220 A1 | 11/2017 | Kozuki |
| 2020/0371233 A1* | 11/2020 | Suzuki ................ G01S 7/52023 |
| 2021/0096245 A1* | 4/2021 | Kozuki ................... G01S 15/89 |

FOREIGN PATENT DOCUMENTS

| | | | |
|---|---|---|---|
| JP | H01-93580 U | 6/1989 | |
| JP | 2000-022424 A | 1/2000 | |
| JP | 2004-212285 A | 7/2004 | |
| JP | 2004-309367 A | 11/2004 | |
| JP | 2014-178320 A | 9/2014 | |
| JP | 2015-055577 A | 3/2015 | |
| JP | 2016-090453 A | 5/2016 | |
| JP | 2020-190451 A | 11/2020 | |
| JP | 2020190451 A * | 11/2020 | ............. G01S 15/89 |

* cited by examiner

FIRST EMBODIMENT

FIRST EMBODIMENT

SECOND MODIFICATION OF FIRST EMBODIMENT

MODIFICATION OF THIRD EMBODIMENT

FIG. 19

MODIFICATION OF TRANSDUCER

UNDERWATER DETECTION APPARATUS AND UNDERWATER DETECTION METHOD

CROSS-REFERENCE TO RELATED APPLICATION(S)

This application is a continuation of U.S. patent application Ser. No. 16/846,088 filed Apr. 10, 2020, which claims priority under 35 U.S.C. § 119 to Japanese Patent Application No. 2019-095204, which was filed on May 21, 2019, the entire disclosure of which is hereby incorporated by reference.

TECHNICAL FIELD

The present disclosure relates to an underwater detection apparatus and an underwater detection method which detect underwater.

BACKGROUND

As disclosed in U.S. Pat. No. 9,335,412B2, it is known that an underwater detection apparatus transmits a fan beam from a transmission element and receives an echo by a reception element.

The underwater detection apparatus disclosed in U.S. Pat. No. 9,335,412B2 performs a transmission and reception processings of a pulse type while rotating a wave transmission element and a wave receiving element by a motor. A reception fan beam is completely included in a range of a transmission fan beam in a plan view.

Meanwhile, an underwater detection apparatus utilizing a so-called multi-ping type is known. Also in this multi-ping type, a reception fan beam may be formed, while transmitting a transmission fan beam by rotating a transmission element and a reception element about a vertical axis by the motor. In such a configuration, it is necessary to increase a transmission horizontal beam width in the rotating direction as an apparatus scanning direction, in order to accelerate an image update cycle at which a detection result is displayed on a screen. By increasing the transmission horizontal beam width, a reflection wave included in a reception beam is quickly detectable, and, as a result, the image update cycle can be accelerated.

Here, it is known to utilize the narrow transmission and reception beams so that underwater is detectable with appropriate resolution. However, since underwater sound speed is slow, the echo will be overlooked if the transmission and reception beams are moved (e.g., the transmission and reception beams are rotated by a PPI sonar). As a measure for reducing such an overlook of the echo, it is possible to widen the transmission beam, while keeping the reception beam narrow, for example, in the configuration of U.S. Pat. No. 9,335,412B2. With this configuration, even if the transmission and reception beams are rotated, the appropriate resolution is securable and the overlook of the echo is reduced.

However, since the widening of the transmission beam width induces a reduction in the source level, and as a result, induces a reduction in the detection range, it is desirable not to expand the transmission beam width as much as possible.

SUMMARY

The present disclosure is to solve the above situations, and one purpose thereof is to provide an underwater detection apparatus and an underwater detection method, capable of both speeding-up of an updating cycle of a detection result image and preventing a reduction in a detection range.

According to one aspect of the present disclosure, an underwater detection apparatus is provided which includes a transmission transducer, a reception transducer, and a motor. The transmission transducer transmits a transmission wave within a given fan-shaped transmission space, the fan-shaped transmission space having a first transmission width in a given first plane and a second transmission width in a second plane perpendicular to the first plane. The reception transducer receives, as a reception wave, a reflection wave of the transmission wave within a given fan-shaped reception space, the fan-shaped reception space having a first reception width in the first plane and a second reception width in the second plane, the second reception width being wider than the second transmission width, and in the second plane, the fan-shaped transmission space being within the fan-shaped reception space. The motor rotates the fan-shaped transmission space and the fan-shaped reception space.

According to some example embodiments, when the motor rotates in a given direction, one edge of a pair of edges of the fan-shaped transmission space may be positioned on a front edge of the fan-shaped reception space relative to the given direction.

According to another aspect of the present disclosure, an underwater detection method is provided, which includes transmitting a transmission wave within a given fan-shaped transmission space, the fan-shaped transmission space having a first transmission width in a given first plane and a second transmission width in a second plane perpendicular to the first plane, receiving, as a reception wave, a reflection wave of the transmission wave within a given fan-shaped reception space, the fan-shaped reception space having a first reception width in the first plane and a second reception width in the second plane, the second reception width being wider than the second transmission width, and in the second plane, the fan-shaped transmission space being within the fan-shaped reception space, and rotating the fan-shaped transmission space and the fan-shaped reception space.

According to the present disclosure, both the speed-up of the updating cycle of the detection result image and the prevention of the reduction in the detection range can be achieved.

BRIEF DESCRIPTION OF DRAWINGS

The present disclosure is illustrated by way of example and not by way of limitation in the figures of the accompanying drawings, in which like reference numerals indicate like elements and in which:

FIG. 11A illustrates a state where the wave transmitter and the wave receiver are rotated in a first direction, and FIG. 11B illustrates a state where the wave transmitter and the wave receiver are rotated in a second direction;

FIG. 19 is a plan view of the ship to which the underwater detection apparatus is mounted, seen in a direction perpendicular to the second plane, where a transmission fan-shaped space formed by the wave transmitter and a reception fan-shaped space are schematically illustrated;

DETAILED DESCRIPTION

First Embodiment

Figure 1:
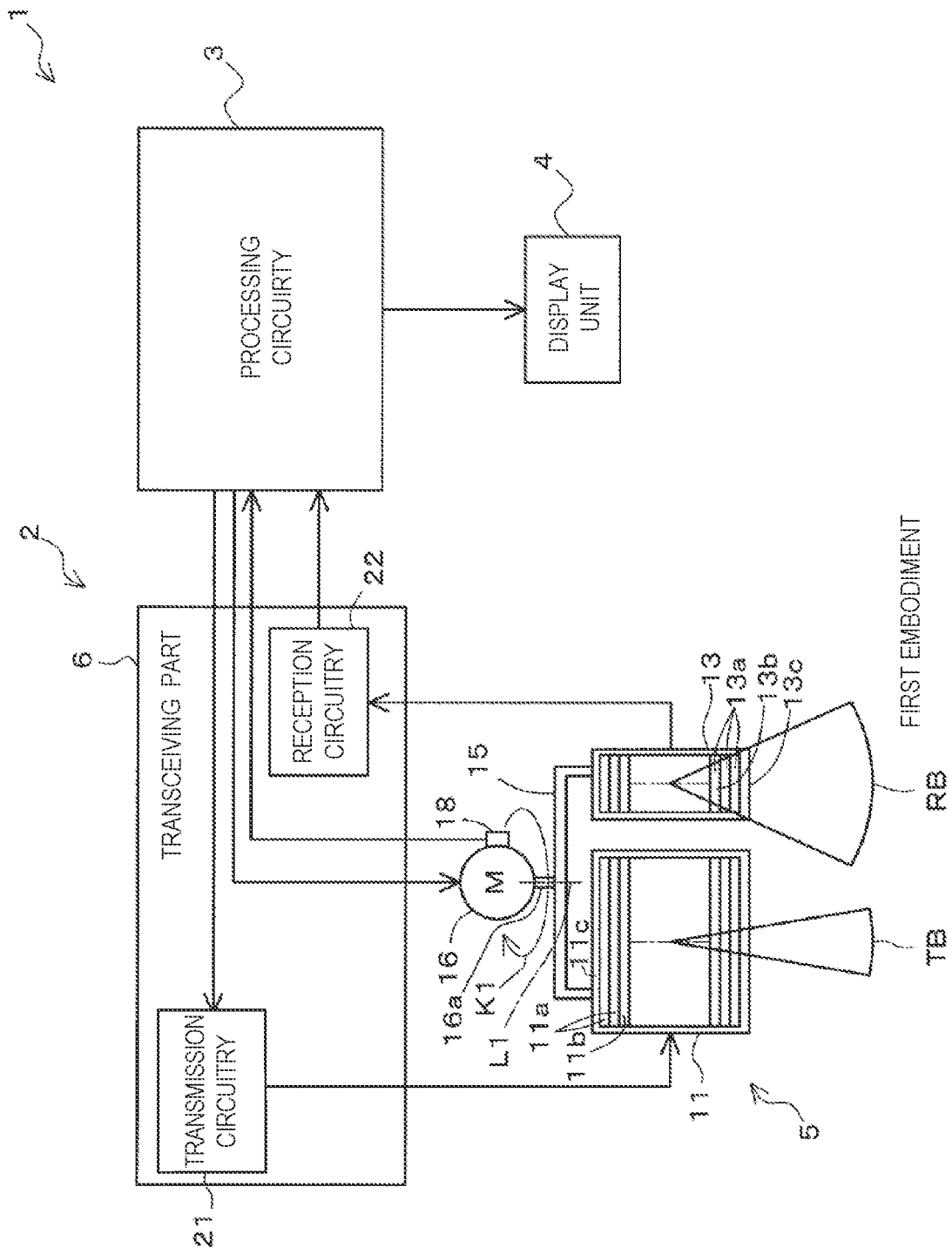
FIG. 1 is a block diagram illustrating a configuration of an underwater detection apparatus according to one embodiment of the present disclosure.

Hereinafter, an underwater detection apparatus according to a first embodiment of the present disclosure is described with reference to the accompanying drawings. An underwater detection apparatus 1 according to this embodiment of the present disclosure may be an ultrasonic detection apparatus of a so-called "multi-ping" type. This multi-ping type may also be referred to as a "multi-pulse" type.

General pulse-type underwater detection apparatuses among all the pulse types other than the multi-ping type may transmit a transmission pulse wave (transmission wave), a wave receiver of the underwater detection apparatus may then receive a reflection wave of the transmission pulse wave as a reception wave while the transmission pulse wave goes and comes back in a detection range. Then, after a time for the transmission pulse wave to go and come back in the detection range is lapsed, the subsequent transmission pulse wave may be transmitted. On the other hand, the underwater detection apparatus of the multi-ping type among all the pulse types may first transmit a transmission pulse wave in a given frequency band, and transmit the subsequent transmission pulse wave in a frequency band different from the given frequency band before the transmission pulse wave goes and comes back in the detection range. The reflection wave of the transmission pulse wave may be extracted by a filter corresponding to each frequency band. Therefore, according to the underwater detection apparatus of the multi-ping type, since a wave transmission interval of the transmission pulse wave can be narrowed, a detection cycle of a target object can be accelerated compared with the underwater detection apparatus of the general pulse type.

Note that, in this embodiment, one example in which the underwater detection apparatus 1 is the multi-ping type is described, however, the configuration may be altered. For example, the present disclosure may be applied to the underwater detection apparatus which performs transmission and reception processing of the general pulse type other than the multi-ping type, or may be applied to the underwater detection apparatus which performs transmission and reception processing of a FMCW (Frequency Modulated Continuous Wave) type.

For example, the underwater detection apparatus 1 is mounted to the bottom of a ship S (hereinafter, referred to as "the ship" to distinguish from other ships), and it may be mainly used for detection of a target object, such as a single fish and a school of fish. In addition, the underwater detection apparatus 1 may be used for detection of ups and downs of the seabed like a reef, a structure like an artificial fish reef, etc. Moreover, according to this underwater detection apparatus 1, a three-dimensional position and shape of the target object can be grasped, as will be described later in detail. Note that the present disclosure may be applied to ships which typically travel on water or sea which are referred to as surface ships, and may also be applied to other types of ships including boats, dinghies, watercrafts, and vessels. Further, the present disclosure may also be applied, if applicable, to submarines.

[Entire Configuration]

FIG. 1 is a block diagram illustrating a configuration of the underwater detection apparatus 1 according to this embodiment of the present disclosure. As illustrated in FIG. 1, the underwater detection apparatus 1 may include a transceiving device 2, a signal processor 3 (which may also be referred to as processing circuitry 3), and a display unit 4.

[Configuration of Transceiving Device]

The transceiving device 2 may include a wave transceiving unit 5 and a transceiving part 6.

The wave transceiving unit 5 may include a wave transmitter 11 constituted as a transmission transducer, a wave receiver 13 constituted as a reception transducer, a bracket 15 which supports the wave transmitter 11 and the wave receiver 13, a motor 16 as a rotary driving part, and a rotational angle detecting part 18.

Figure 2:
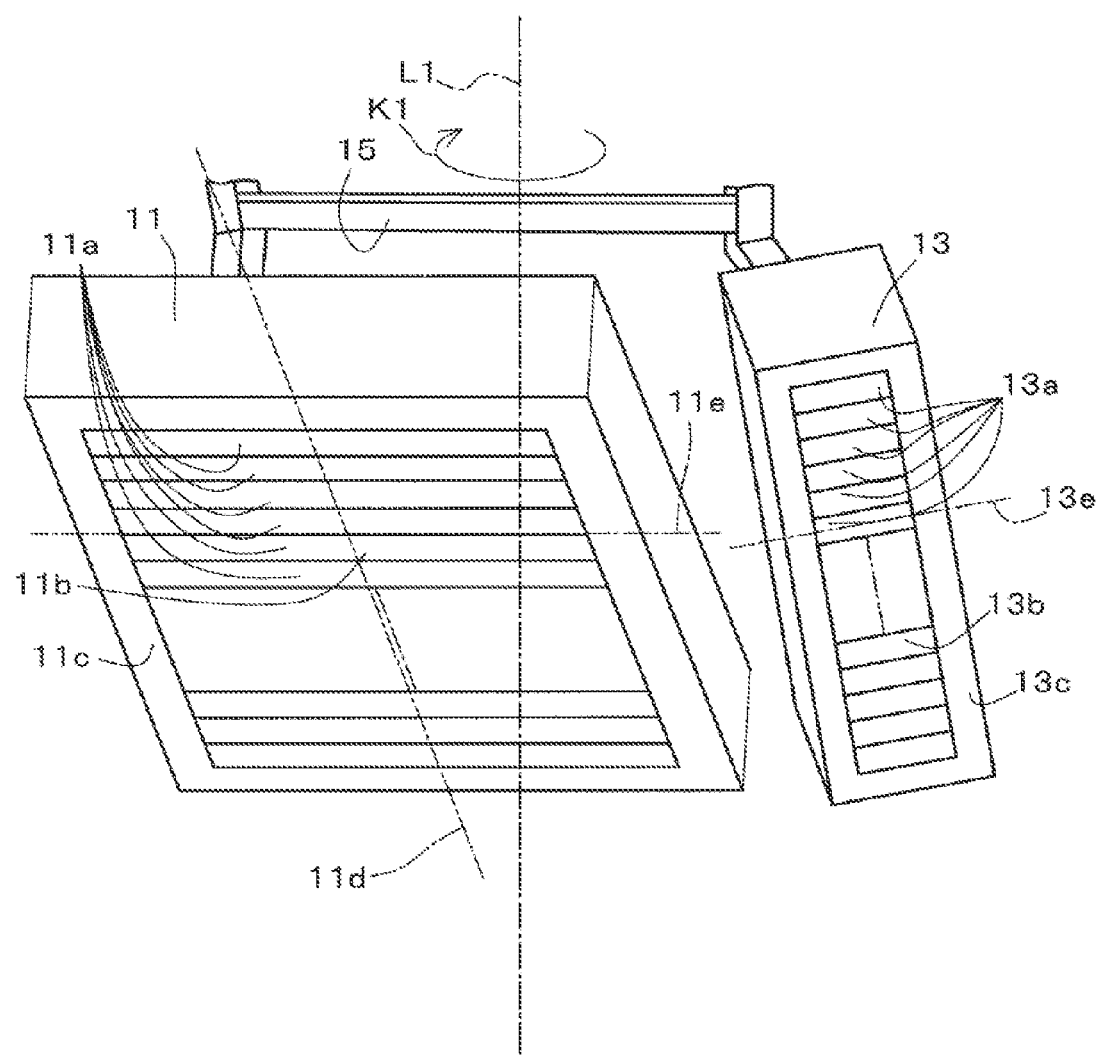
FIG. 2 is a perspective view schematically illustrating a substantial part of a wave transceiving unit.
Figure 3:
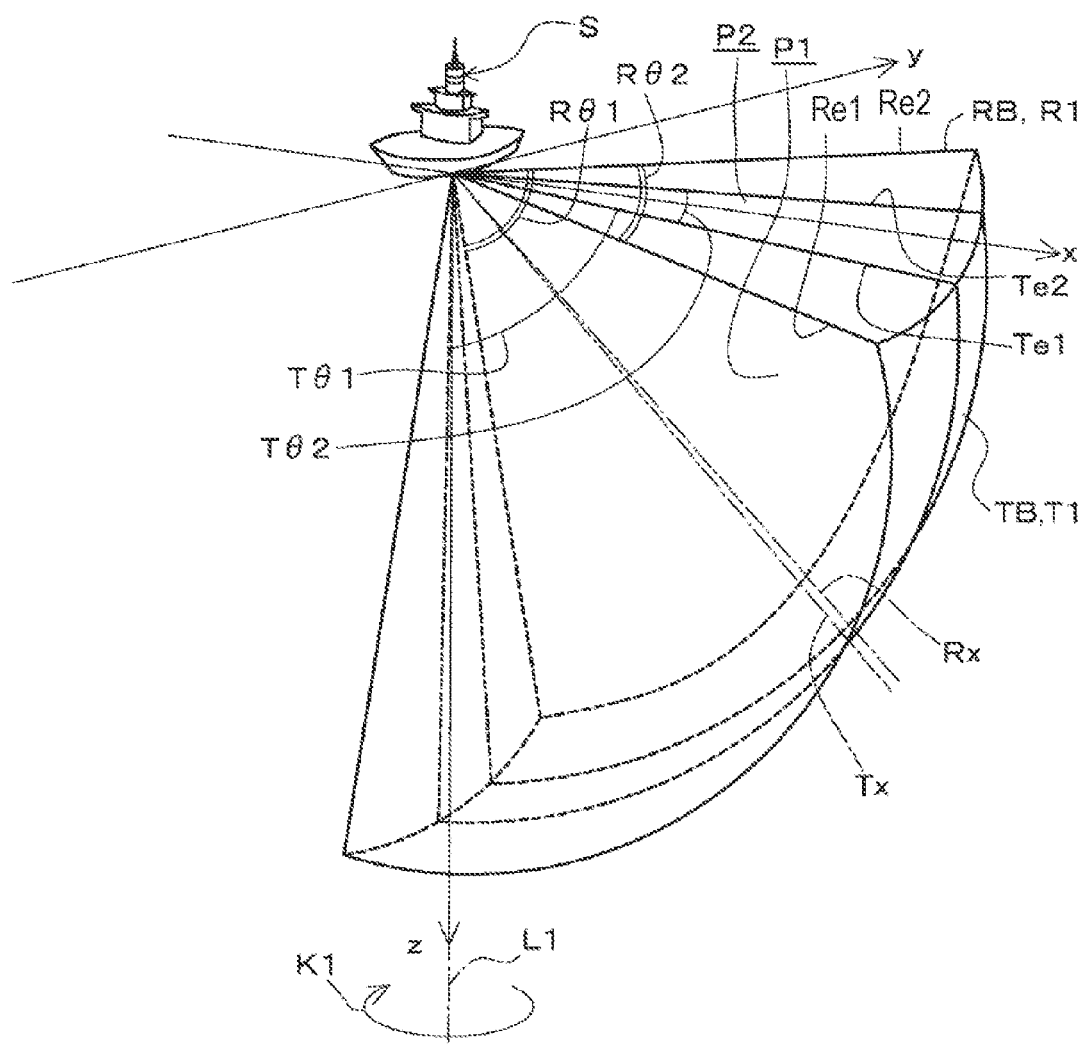
FIG. 3 is a view schematically illustrating a transmission beam formed by a wave transmitter and a reception beam received by a wave receiver.

FIG. 2 is a perspective view schematically illustrating a substantial part of the wave transceiving unit 5. FIG. 3 is a view schematically illustrating a transmission beam TB formed by the wave transmitter 11, and a reception beam RB received by the wave receiver 13. Referring to FIGS. 1 to 3, the wave transmitter 11 may be provided in order to transmit a pulse-shaped ultrasonic wave underwater. The wave transmitter 11 may have a wave transmitting surface 11b. This wave transmitting surface 11b may be a surface from which the ultrasonic wave is transmitted, and the wave transmitter 11 may be installed in the bottom of the ship S so that the wave transmitting surface 11b is disposed under the sea surface, and may be accommodated in a casing (not illustrated). The wave transmitter 11 may have a configuration in which one or more wave transmission elements 11a as an ultrasonic transducer is attached to a casing 11c. In this embodiment, a plurality of wave transmission elements 11a may be disposed linearly. That is, the wave transmitter 11 may be a linear array.

The wave receiver 13 may have a configuration in which one or more wave receiving elements 13a as an ultrasonic transducer is attached to a casing 13c. The wave receiver 13 may be provided separately from the wave transmitter 11. The wave receiver 13 may have a wave receiving surface 13b. The wave receiving surface 13b may be a surface for receiving the ultrasonic wave, and the wave receiver 13 may be installed in the bottom of the ship S so that the wave receiving surface 13b is disposed under the sea surface, and may be accommodated in the casing (not illustrated) together with the wave transmitter 11. Each wave receiving element 13a of the wave receiver 13 may receive, as the reception wave, the reflection wave of each transmission pulse wave (each transmission wave) which is the ultrasonic wave transmitted from the wave transmitter 11, and convert it into an echo signal as an electric signal. In this embodiment, a plurality of wave receiving elements 13a may be disposed linearly. That is, the wave receiver 13 may be a linear array.

In this embodiment, the wave transmitter 11 and the wave receiver 13 may be separate components, and therefore, they may be mutually different transducers. In this embodiment, a length of the wave transmission element 11a of the wave transmitter 11 (i.e., a lateral width) may be set longer than a length of the wave receiving element 13a of the wave receiver 13 (i.e., a lateral width). The wave transmitter 11 and the wave receiver 13 may be supported by the bracket 15 as described above. For example, the bracket 15 may be a frame member formed by combining steel members, and may be coupled to the casing 11c of the wave transmitter 11 and to the casing 13c of the wave receiver 13.

The wave transmitter 11 may be fixed at a given angle position about a given vertical axis 11d with respect to the wave receiver 13. The vertical axis 11d may be an axis which extends in the longitudinal direction of the casing 11c (i.e., the array direction of the plurality of wave transmission elements 11a) and penetrates the center of an upper surface and a lower surface of the casing 11c. By setting the angle of the wave transmitter 11 about the vertical axis 11d, a relative position of a transmission fan-shaped space T1 and a reception fan-shaped space R1, which will be described later, can be set.

Moreover, the wave receiver 13 may be fixed to a given angle position about a second given horizontal axis 13e with respect to the wave transmitter 11. The second horizontal axis 13e may be an axis which extends in the transverse direction of the casing 13c (i.e., a width direction of the wave receiving element 13a) and penetrates the center of both left and right side surfaces of the casing 13c. By setting the angle of the wave receiver 13 about the second horizontal axis 13e, a direction of the reception fan-shaped space R1 with respect to the seabed surface can be set optimally.

Moreover, the wave transmitter 11 may be fixed to a given angle position about a given first horizontal axis 11e with respect to the wave receiver 13. The first horizontal axis 11e may be an axis which extends in the transverse direction of the casing 11c, i.e., in the width direction of the wave transmission element 11a, and penetrates the center of both left and right side surfaces of the casing 11c. By setting the angle of the wave transmitter 11 about the first horizontal axis 11e, a direction of the transmission fan-shaped space T1 with respect to the seabed surface can be set optimally.

A vertical plane which spreads in the vertical direction and includes the first horizontal axis 11e and a vertical plane which spreads in the vertical direction and includes the second horizontal axis 13e may be different from each other. That is, the vertical plane including the first horizontal axis 11e and the vertical plane including the second horizontal axis 13e may be constituted as mutually different vertical planes, and the first horizontal axis 11e and the second horizontal axis 13e may be constituted so as not to be included in a common vertical plane.

As described above, the underwater detection apparatus 1 may rotate the wave transmitter 11 with respect to the first horizontal axis 11e to dispose the wave transmitting surface 11b of the wave transmitter 11 obliquely to the vertical plane. Moreover, the underwater detection apparatus 1 may rotate the wave receiver 13 with respect to the second horizontal axis 13e to dispose the wave receiving surface 13b of the wave receiver 13 obliquely to the vertical plane. The first horizontal axis 11e and the second horizontal axis 13e may not be included in the common vertical plane. Therefore, in the underwater detection apparatus 1, the wave transmitting surface 11b and the wave receiving surface 13b may be both disposed obliquely to the vertical plane, and a direction perpendicular to the wave transmitting surface 11b and a direction perpendicular to the wave receiving surface 13b may not be parallel to each other, but mutually different directions. The wave transmitter 11 and the wave receiver 13 may be integrally rotated by the motor 16.

In this embodiment, the motor 16 may drive the wave transmitter 11 and the wave receiver 13 to rotate them with the bracket 15 about a rotation axis L1 which is the center axis extending in the vertical direction. The motor 16 may be a motor of which the rotational position is controllable, such as a stepping motor, a servo motor, etc. The motor 16 may be driven in response to an operational instruction from the signal processor 3, by drive current according to this operational instruction. An output shaft 16a of the motor 16 may be coupled to the bracket 15 so that power transfer is possible, and the wave transmitter 11 and the wave receiver 13 may rotate along a horizontal plane perpendicular to the vertical direction. In this embodiment, a rotating direction of the motor 16 may be a given fixed direction, and may be a first direction K1 which is one of the rotating directions about the rotation axis L1. In this embodiment, a slip ring may be used so that a twist does not occur on cables connected to the motor 16 due to the fixation of the rotating direction of the motor 16. In this embodiment, the motor 16 may continuously rotate the wave transmitter 11 and the wave receiver 13. However, without being limited to this configuration, the motor 16 may repeat a rotation and a stop or a suspension so that it repeats an operation in which it rotates by a given angle at every given time interval and suspends for a given period of time after the rotation.

The rotating speed of the motor 16 when the underwater detection is performed may be set as the normal rotating speed. The normal rotating speed in this case may mean a rotating speed required for transmitting and receiving the echo using the multi-pin technology. For example, the rotating speed (angle/time) may be set to below "wave receiving horizontal beam width"/"round-trip propagation time of sound wave in a range where the reception wave detection is to be carried out/speed-up rate."

The rotational angle detecting part 18 may be attached to the motor 16. Note that the rotational angle detecting part 18 may be attached to the motor 16, or may be disposed separately from the motor 16. For example, an encoder is used as the rotational angle detecting part 18. However, without being limited to this configuration, the signal for controlling the rotation of the motor 16 may be analyzed and converted into angular information. In detail, if the stepping motor is used as the motor 16, the number of instruction pulses inputted into the stepping motor may be counted and converted into the angular information. In the underwater detection apparatus 1, the angle position of the wave transmitter 11 and the wave receiver 13 in φ-direction may be calculated based on the rotational angle of the motor 16 detected by the rotational angle detecting part 18. Note that the φ-direction may be a direction about the rotation axis L1 of the motor 16.

The wave transmitter 11 may form the transmission fan-shaped space T1 which is a range or space to which the three-dimensional transmission beam TB is outputted as illustrated in FIG. 3. The transmission fan-shaped space T1 may be a substantially fan-shaped beam (fan beam). That is, the wave transmitter 11 may transmit the transmission wave into the transmission fan-shaped space T1. The transmission fan-shaped space T1 may be a range or space which includes a center axis Tx at which transmission signal power of the transmission wave transmitted from the wave transmitter 11 becomes the maximum, and where the transmission signal power is halved to −3 dB from the maximum. That is, the transmission fan-shaped space T1 may be a range or space having the power at or more than half of the maximum power of the transmission wave transmitted from the wave transmitter 11. In this embodiment, the wave transmitter 11 may be provided to the ship's bottom so that the center axis Tx of the transmission fan-shaped space T1 becomes obliquely to the vertical direction (z-axis direction in FIG. 3). Note that the transmission fan-shaped space T1 may be a range where the transmission signal power is reduced by −n1 dB (n1 is set according to a detection target object etc. of the underwater detection apparatus 1) from the maximum.

The transmission fan-shaped space T1 may have a first transmitting width Tθ1 in a given first plane P1, and have a second transmitting width Tθ2 in a second plane P2 perpendicular to the first plane P1. The first transmitting width Tθ1 may be wider than the second transmitting width Tθ2. The transmission fan-shaped space T1 may be formed in the fan shape in both the first plane P1 and the second plane P2. In this embodiment, the first plane P1 may be a vertical plane including the rotation axis L1 of the motor 16. Moreover, in this embodiment, the second plane P2 may be a horizontal plane. The first transmitting width Tθ1 may be an angle width about the horizontal axis centering on the wave transmitter 11. The second transmitting width Tθ2 may be an angle width about the rotation axis L1 of the motor 16.

Note that, as described above, when the transmission signal power at edges Te1 and Te2 of the transmission fan-shaped space T1 is a magnitude which is −3 dB that from the transmission signal power at the center axis Tx, the second transmitting width Tθ2 is smaller than the first transmitting width Tθ1. On the other hand, for example, when the transmission signal power at the edges Te1 and Te2 of the transmission fan-shaped space T1 is a magnitude which is −10 dB (i.e., smaller than −3 dB) that from the transmission signal power at the center axis Tx, the second transmitting width Tθ2 may be larger than the first transmitting width Tθ1.

An angle formed by a direction which is perpendicular to the wave transmitting surface 11b of the linear array and in which the transmission fan-shaped space T1 is formed, and the horizontal plane, may be any angle as long as it is within a range from 0° which is an angle in case where the linear array is disposed in the vertical direction to 90° which is an angle in case where the linear array is disposed in the horizontal direction.

The wave receiver 13 may receive a signal of the reception fan-shaped space R1 where the three-dimensional reception beam RB is formed as illustrated in FIG. 3. The reception fan-shaped space R1 may be a substantially fan-shaped beam. That is, the wave receiver 13 may receive the reception wave which is the reflection wave of the transmission wave within the reception fan-shaped space R1. The reception fan-shaped space R1 may be a range or space which includes a center axis Rx at which reception power sensitivity of the wave receiver 13 becomes the maximum, and where the reception power sensitivity of the wave receiver 13 is halved from the maximum to −3 dB. That is, the reception fan-shaped space R1 may be a range or space having the sensitivity at or more than half of the maximum reception power sensitivity of the wave receiver 13. In this embodiment, the wave receiver 13 may be provided to the ship's bottom so that the center axis Rx of the reception fan-shaped space R1 becomes obliquely to the vertical direction (the z-axis direction in FIG. 3). Note that the reception fan-shaped space R1 may be a range where the reception power sensitivity is reduced from the maximum by −n2 dB (n2 is set according to the detection target object etc. of the underwater detection apparatus 1).

The motor 16 may rotate the transmission fan-shaped space T1 and the reception fan-shaped space R1 about the rotation axis L1 which is the axis perpendicular to the second plane P2. In detail, the motor 16 may rotate the transmission fan-shaped space T1 and the reception fan-shaped space R1 by rotating the wave transmitter 11 and the wave receiver 13.

The wave receiver 13 of this embodiment may perform a detection by the thin reception beam RB which scans electronically inside the reception fan-shaped space R1 as the fan-shaped space in which the linear array of the wave receiver 13 has a gain by performing a beam forming with the transceiving part 6 and the signal processor 3 which will be described in detail below.

The reception fan-shaped space R1 may have a first receiving width Rθ1 in the first plane P1 and a second receiving width Rθ2 in the second plane P2, and the first receiving width Rθ1 may be wider than the second receiving width Rθ2. Further, the second receiving width Rθ2 of the reception fan-shaped space R1 may be wider than the second transmitting width Tθ2 of the transmission fan-shaped space T1 (i.e., Rθ2>Tθ2). The reception fan-shaped space R1 may be formed in the fan shape both in the first plane P1 and the second plane P2. The first receiving width Rθ1 may be an angle width about the horizontal axis centering on the wave receiver 13. The second receiving width Rθ2 may be an angle width about the rotation axis L1 of the motor 16.

Note that, as described above, when the reception power sensitivity at edges Re1 and Re2 of the reception fan-shaped space R1 is the magnitude of −3 dB from the reception power sensitivity at the center axis Rx, the second receiving width Rθ2 is smaller than the first receiving width Rθ1. On the other hand, for example, when the reception power sensitivity at the edges Re1 and Re2 of the reception fan-shaped space R1 is the magnitude of −10 dB (i.e., smaller than −3 dB) of the reception power sensitivity at the center axis Rx, the second receiving width Rθ2 may be larger than the first receiving width Re1.

The first transmitting width Tθ1 and the first receiving width Re1 are not limited in particular, or may be within a range of 6° to 90°. For example, although the second receiving width Rθ2 is 36°, it may not be limited to this width or may be an angle less than 90° as long as it is larger than the second transmitting width Tθ2. On the other hand, for example, the second transmitting width Tθ2 is 6°.

The angle formed by the direction perpendicular to the wave receiving surface 13b of the linear array and in which the reception fan-shaped space R1 is formed, and the horizontal plane, may be any angle, as long as it is within a range from 0° which is the angle in case where the linear array is disposed in the vertical direction to 90° which is the angle in case where the linear array is disposed in the horizontal direction.

Figure 4A:
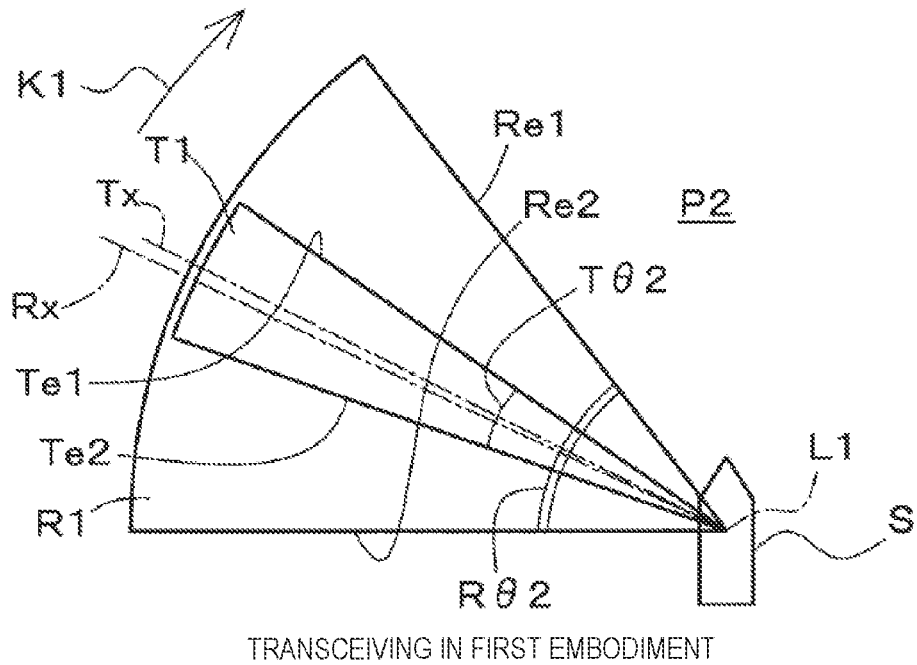
FIG. 4A is a plan view of a ship to which the underwater detection apparatus is mounted, seen in a direction perpendicular to a second plane, and schematically illustrates a transmission fan-shaped space formed by the wave transmitter and a reception fan-shaped space received by the wave receiver.

FIG. 4A is a plan view of the ship S to which the underwater detection apparatus 1 is mounted, seen in a direction perpendicular to the second plane P2, and schematically illustrates the transmission fan-shaped space T1 formed by the wave transmitter 11 and the reception fan-shaped space R1 received by the wave receiver 13. Note that, in each of FIGS. 4A to 4C, although a distance from the ship S to a tip end of the reception fan-shaped space R1 differs from a distance from the ship S to a tip end of the transmission fan-shaped space T1, this difference may be for the sake of facilitating the illustration and does not necessarily show the actual ranges accurately. Referring to FIGS. 1 to 4A, in the plan view, the transmission fan-shaped space T1 and the reception fan-shaped space R1 may be rotated covering all the directions around the ship S by the wave transmitter 11 and the wave receiver 13 rotating about the rotation axis L1 in the first direction K1 in connection with the rotation of the motor 16.

The underwater detection apparatus 1 may calculate rotational angular positions of the wave transmitter 11 and the wave receiver 13 about the rotation axis L1 based on the rotational angle of the motor 16 detected by the rotational angle detecting part 18.

In the second plane P2, the central line Tx of the transmission fan-shaped space T1 may be a line at which the transmission signal power is the highest in the transmission fan-shaped space T1. On the other hand, the first transmission edge Te1 and the second transmission edge Te2 as a pair of edges of the transmission fan-shaped space T1 about the rotation axis L1 in the second plane P2 may be lines at positions where the transmission signal power is the lowest in the transmission fan-shaped space T1. The transmission signal power at these transmission edges Te1 and Te2 may be a half of the transmission signal power at the center axis Tx. For example, when the motor 16 rotates, in the plan view, in the first direction K1 as a clockwise direction, the first transmission edge Te1 may be a leading edge or front edge in the first direction K1 and the second transmission edge Te2 may be a trailing edge in the first direction K1.

In the second plane P2, the center axis Rx of the reception fan-shaped space R1 may be a line at which the reception power sensitivity is the highest in the reception fan-shaped space R1. On the other hand, about the rotation axis L1 in the second plane P2, the first reception edge Re1 and the second reception edge Re2 as the pair of edges of the reception fan-shaped space R1 may be the lines at the positions where the reception power sensitivity is the lowest in the reception fan-shaped space R1. In this embodiment, the reception power sensitivity in the reception edges Re1 and Re2 may be a half of the reception power sensitivity at the center axis Rx. When the motor 16 rotates in the first direction K1, the first reception edge Re1 may be the leading edge in the first direction K1 and the second reception edge Re2 may be the trailing edge in the first direction K1.

In this embodiment, in the second plane P2, the transmission fan-shaped space T1 may be located in the reception fan-shaped space R1. That is, the transmission fan-shaped space T1 may be located so as to be included in the reception fan-shaped space R1.

In detail, in the second plane P2, both the pair of the transmission edges Te1 and Te2 of the transmission fan-shaped space T1 may be located in the reception fan-shaped space R1. In this embodiment, the transmission fan-shaped space T1 may be located in the reception fan-shaped space R1 at the angle position near a substantially center in the range of the angle width of the second receiving width Rθ2. Further, in this embodiment, in the second plane P2, the center axis Tx of the transmission fan-shaped space T1 and the center axis Rx of the reception fan-shaped space R1 may not overlap with each other, and the center axis Tx of the transmission fan-shaped space T1 may be offset to one side of the transmission fan-shaped space T1 in the first direction K1 (in more detail, forward or front side in the first direction K1) with respect to the center axis Rx of the reception fan-shaped space R1. Therefore, in the underwater detection apparatus 1, the wave transmitter 11 and the wave receiver 13 may be configured so that the transmission fan-shaped space T1 is located forward or front side in the rotating direction of the motor 16 (the first direction K1) in the reception fan-shaped space R1, when the motor 16 rotates in the first direction K1 (the given direction). Note that, in this embodiment, although the center axis Tx of the transmission fan-shaped space T1 and the center axis Rx of the reception fan-shaped space R1 are not overlapped with each other in the second plane P2, this configuration may be altered. That is, in the second plane P2, the center axis Tx of the transmission fan-shaped space T1 and the center axis Rx of the reception fan-shaped space R1 may be overlapped with each other.

Note that, in FIG. 4A, although the transmission fan-shaped space T1 is located in the reception fan-shaped space R1 at the angle position near the substantially center in the range of the angle width of the second receiving width Rθ2, this configuration may be altered. That is, relations other than the relation between the transmission fan-shaped space T1 and the reception fan-shaped space R1 which is illustrated in FIG. 4A may be established. One example of such a relation is described with reference to FIG. 4B.

Figure 4B:
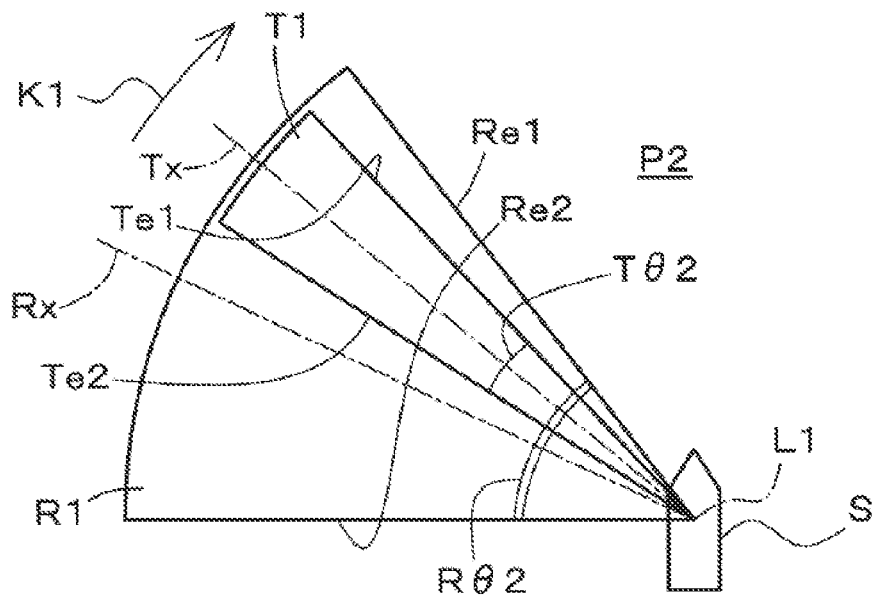
FIG. 4B is a view illustrating a modification of a relation between the transmission fan-shaped space and the reception fan-shaped space in the second plane.

FIG. 4B is a view illustrating a modification of the relation between the transmission fan-shaped space T1 and the reception fan-shaped space R1 in the second plane P2. In this modification, the transmission fan-shaped space T1 may be located in the reception fan-shaped space R1, and the center axis Tx of the transmission fan-shaped space T1 may greatly be offset forward or front side in the first direction K1 with respect to the center axis Rx of the reception fan-shaped space R1, as compared with the configuration illustrated in FIG. 4A. Therefore, in this modification, the wave transmitter 11 and the wave receiver 13 may be configured so that the transmission fan-shaped space T1 is fully located forward or front side in the rotating direction of the motor 16 (the first direction K1) in the reception fan-shaped space R1, when the motor 16 rotates in the first direction K1. Moreover, in this modification, the wave transmitter 11 and the wave receiver 13 may be configured so that the transmission fan-shaped space T1 is located in the forward half or front half side of the reception fan-shaped space R1 in the rotating direction of the motor 16 in the second plane P2, when the motor 16 rotates in the first direction K1.

Figure 4C:
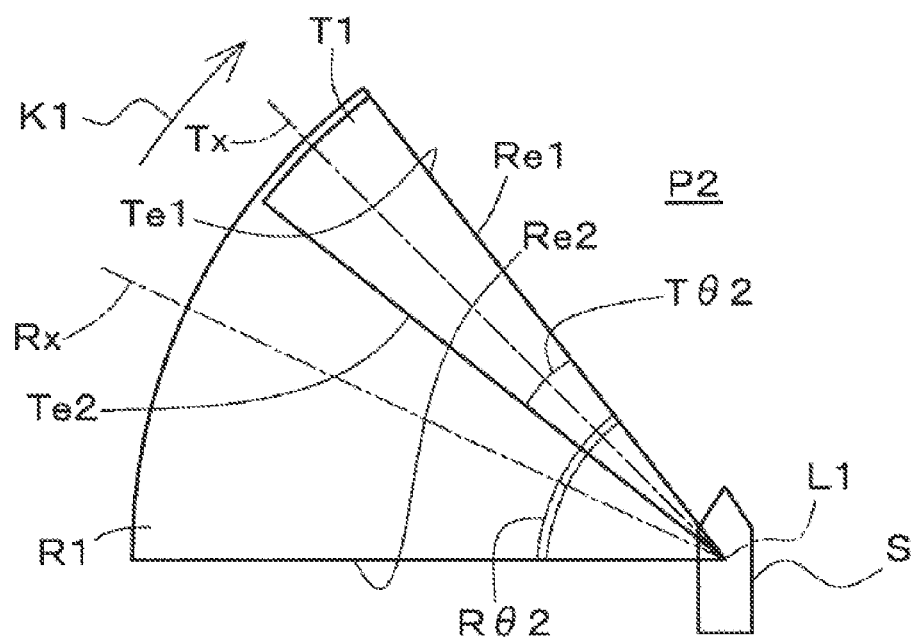
FIG. 4C is a view illustrating a further modification of the relation between the transmission fan-shaped space and the reception fan-shaped space in the second plane.

Further, a relation different from the relation illustrated in FIG. 4B may be established. FIG. 4C is a view illustrating a further modification of the relation between the transmission fan-shaped space T1 and the reception fan-shaped space R1 in the second plane P2. In the modification illustrated in FIG. 4C, the transmission fan-shaped space T1 may further be offset forward or front side in the first direction K1 in the reception fan-shaped space R1, compared with the modification illustrated in FIG. 4B. In more detail, in the modification illustrated in FIG. 4C, the first transmission edge Te1 and the first reception edge Re1 which are the leading edges of the transmission fan-shaped space T1 and the reception fan-shaped space R1 in the first direction K1 may be overlapped with each other in the second plane P2. That is, the wave transmitter 11 and the wave receiver 13 may be configured so that the transmission edge Te1 which is one of the pair of the transmission edges Te1 and Te2 of the transmission fan-shaped space T1 is located at the leading reception edge Re1 of the reception fan-shaped space R1 in the rotating direction of the motor 16 (the first direction K1), when the motor 16 rotates in the first direction K1 (the given direction). With such a configuration, in this modification, the wave transmitter 11 and the wave receiver 13 may be configured so that the transmission fan-shaped space T1 is located forward or front end side in the rotating direction of the motor 16 (the first direction K1) in the reception fan-shaped space R1, when the motor 16 rotates in the first direction K1. In addition, in this modification, the wave transmitter 11 and the wave receiver 13 may be configured so that the transmission fan-shaped space T1 is located in the forward half or front half side of the reception fan-shaped space R1 in the rotating direction of the motor 16 (the first direction K1) in the second plane P2, when the motor 16 rotates in the first direction K1.

Next, a configuration of the transceiving part 6 is described. Referring to FIG. 1, the transceiving part 6 may include a transmitting part 21 (which may also be referred to as a transmission circuitry 21) and a receiving part 22 (which may also be referred to as a reception circuitry 22).

The transmitting part 21 may amplify a transmission pulse signal generated by the signal processor 3, and apply the amplified signal to the wave transmitter 11 as an amplified transmission pulse signal. Therefore, from the wave transmitter 11, the transmission pulse waves (transmission waves) corresponding to the respective amplified transmission pulse signals may be transmitted. In detail, in this embodiment, from the wave transmitter 11, a first transmission pulse wave corresponding to a first amplified transmission pulse signal, a second transmission pulse wave corresponding to a second amplified transmission pulse signal, and a third transmission pulse wave corresponding to a third amplified transmission pulse signal may be transmitted with a given time interval therebetween. The frequencies of the first to third transmission pulse waves may be different from each other.

The receiving part 22 may amplify the echo signal as an electric signal outputted from the wave receiver 13, and carry out an A/D conversion of the amplified echo signal. Then, the receiving part 22 may output the echo signal converted into the digital signal to the signal processor 3. In more detail, the receiving part 22 may have a plurality of reception circuitry. Each reception circuitry may perform the given processing described above to the corresponding echo signal (reception signal) acquired by converting the reception wave received by the corresponding wave receiving element 13a into the electric signal, and then output the corresponding echo signal to the signal processor 3.

[Configuration of Display Unit]

The display unit 4 may display on a display screen an image according to an image data outputted from the signal processor 3. In this embodiment, the display unit 4 may display an underwater state below the ship three-dimensionally as a bird's-eye view. Therefore, the user can guess the underwater state below the ship (e.g., the existence and the positions of a single fish and a school of fish, ups and downs of a seabed, and a structure such as an artificial fish reef) by looking at the display screen.

[Configuration of Signal Processor]

Figure 5:
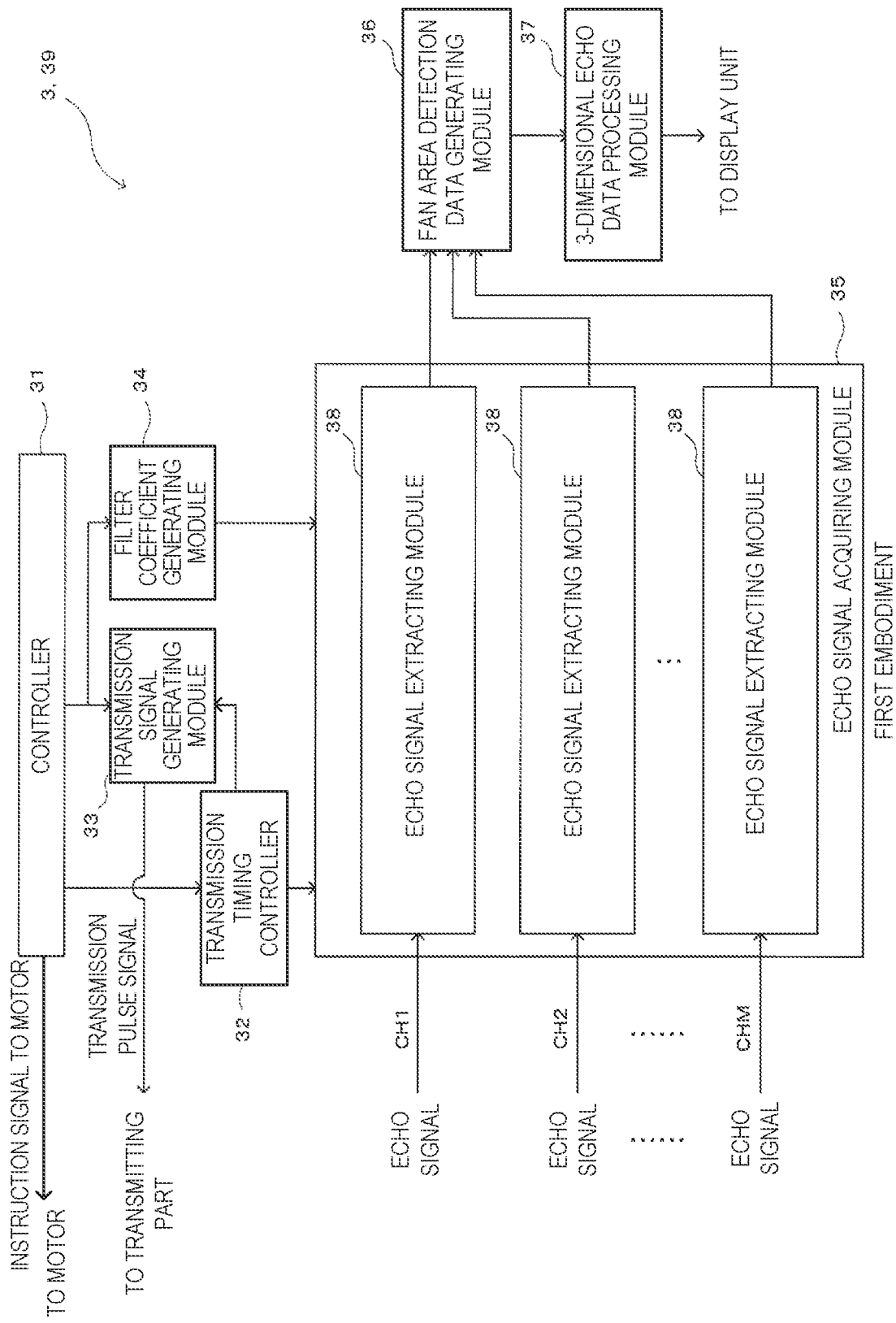
FIG. 5 is a block diagram illustrating a configuration of a signal processor.

FIG. 5 is a block diagram illustrating a configuration of the signal processor 3. Referring to FIGS. 1 and 5, the signal processor 3 may generate the transmission pulse signal as the transmission signal, and input it into the transmitting part 21. Moreover, the signal processor 3 may process the echo signal outputted from the receiving part 22, and generate the image data of the target object.

The signal processor 3 may include a controller 31, a transmission timing controller 32, a transmission signal generating module 33, a filter coefficient generating module 34, an echo signal acquiring module 35, a fan area detection data generating module 36 as an image data generating module, and a three-dimensional echo data processing module 37 as a synthetic image data generating module.

The signal processor 3 may be comprised of devices, such as a hardware processor 39 (a CPU, a FPGA, etc.) and a nonvolatile memory, and is one example of a "processing circuitry" of the present disclosure. For example, the CPU reads the program from the nonvolatile memory and executes it to make the signal processor 3 function as the controller 31, the transmission timing controller 32, the transmission signal generating module 33, the filter coefficient generating module 34, the echo signal acquiring module 35, the fan area detection data generating module 36, and the three-dimensional echo data processing module 37.

The controller 31 may output a variety of information to the transmission timing controller 32, the transmission signal generating module 33, and the filter coefficient generating module 34.

The controller 31 may notify to the transmission timing controller 32 timings at which the transmission timing controller 32 is to output first to third transmitting triggers.

Moreover, the controller 31 may output information on frequency bands of the first to third transmission pulse signals to be generated by the transmission signal generating module 33 to the transmission signal generating module 33 and the filter coefficient generating module 34. The controller 31 may output a first frequency band, a second frequency band, and a third frequency band which are three frequency bands different from each other, as the frequency bands of the first transmission pulse signal, the second transmission pulse signal, and the third transmission pulse signal, respectively, to the transmission signal generating module 33 and the filter coefficient generating module 34.

Moreover, the controller 31 may output a filter specification for generating a filter coefficient used by the filtering performed by the echo signal acquiring module 35 to the filter coefficient generating module 34. Such a filter specification may include a center frequency of a passband, a bandwidth of the passband, a reduction level of a cutoff band, and a filter length.

The transmission timing controller 32 may generate the first to third transmitting triggers at the timings instructed from the controller 31, and then sequentially output the transmitting triggers to the transmission signal generating module 33 and the echo signal acquiring module 35.

Each time the transmission signal generating module 33 receives the first to third transmitting triggers, it may generate the first transmission pulse signal, the second transmission pulse signal, and the third transmission pulse signal corresponding to the trigger signals in this order, and then output them to the transmitting part 21. The first to third transmission pulse signals outputted to the transmitting part 21 may be amplified by the transmitting part 21, and they may be transmitted from the wave transmitter 11 as the first to third transmission pulse waves, respectively.

The filter coefficient generating module 34 may generate the filter coefficients for extracting the first to third echo signals obtained from the respective reception waves as the reflection waves of the first to third transmission pulse waves, based on the information on the first to third frequency bands and the filter specification which are notified from the controller 31.

The controller 31 may output an instruction signal to the motor 16 to control operation of the motor 16. In this embodiment, the controller 31 may control the rotating direction, the rotating speed, and the rotational position of the motor 16. That is, the controller 31 may control the rotating direction, the rotating speed, and the rotational position of the wave transmitter 11 and the wave receiver 13. The controller 31 may set a target output value according to a given operational condition. Then, the controller 31 may cause the rotational angle detecting part 18 to detect the rotational position of the output shaft 16*a* of the motor 16, and control the motor 16 so that a deviation of the detected value and the target output value becomes zero.

The echo signal acquiring module 35 may acquire the echo signal in each frequency band from the echo signal outputted from the wave receiver 13. The echo signal acquiring module 35 may have same number of echo signal extracting module 38 as the number of wave receiving elements 13*a* provided to the wave receiver 13. The echo signal extracting modules 38 may be provided corresponding to the respective wave receiving elements 13*a*.

The processings performed by the echo signal extracting modules 38 may be the same except for the wave receiving elements 13*a* from which the echo signals are outputted being different from each other, and the echo signals outputted through the channels CHm (here, m=1, 2, . . . , M) from the wave receiving elements 13*a* being different from each other.

The fan area detection data generating module 36 may perform a beam forming based on M echo signals acquired from the echo signal extracting modules 38. A case where the delay-and-sum is performed is described as one example of the beam forming. The reception beam RB can be formed by adding the echo signals after a given phase rotation is applied to each echo signal. By changing an amount of the phase rotation applied to each echo data to change the directivity of the reception beam RB in the reception fan-shaped space R1 (i.e., by scanning electronically), the echo intensity at each angle about a horizontal axis perpendicular to the rotation axis L1 can be obtained. The fan area detection data generating module 36 can calculate the echo intensity at each position in a range specified by a distance r from the ship and the angle about the horizontal axis, by obtaining the echo intensity at each angle about the horizontal axis in the distance r. Note that, below, the echo intensity may also be referred to as the "fan area echo intensity."

Then, the fan area detection data generating module 36 may calculate the fan area echo intensity at each of a plurality of angle positions about the rotation axis L1, where the reception fan-shaped space R1 can be located by being rotated by the motor 16, and may generate a plurality of image data based on the fan area echo intensities.

The three-dimensional echo data processing module 37 may synthesize the image data at every angle position about the rotation axis L1 generated by the fan area detection data generating module 36 to generate synthetic image data. This synthetic image data may be outputted to the display unit 4. Then, the display unit 4 may display an image specified by the synthetic image data.

With the above configuration, the underwater detection apparatus 1 can detect the target object in the three-dimensional space covering the large area centering on the ship S, and estimate the three-dimensional position of the target object in this space.

Moreover, by the underwater detection apparatus 1 operating as described above, an underwater detection method of this embodiment may be implemented. That is, in the underwater detection method implemented by operating the underwater detection apparatus 1, first, the transmission wave may be transmitted to the given transmission fan-shaped space T1 having the first transmitting width T$\theta$1 in the given first plane P1 and having the second transmitting width T$\theta$2 in the second plane P2 perpendicular to the first plane P1. Further, the reflection wave of the transmission wave may be received, as the reception wave, in the given reception fan-shaped space R1 which has the first receiving width R$\theta$1 in the first plane P1 and the second receiving width R$\theta$2 in the second plane P2, and where the second receiving width R$\theta$2 is larger than the second transmitting width T$\theta$2. Further, the underwater detection method of this embodiment may be configured so that the transmission fan-shaped space T1 is disposed in the reception fan-shaped space R1 in the second plane P2, and the transmission fan-shaped space T1 and the reception fan-shaped space R1 are rotated.

[Effects]

As described above, according to the underwater detection apparatus 1 according to this embodiment, the second receiving width R$\theta$2 of the reception fan-shaped space R1 may be wider than the second transmitting width T$\theta$2 of the transmission fan-shaped space T1, and in the second plane P2, the transmission fan-shaped space T1 may be located in the reception fan-shaped space R1. With this configuration, even if when the transmission fan-shaped space T1 and the reception fan-shaped space R1 are rotated at high speed, the reception wave corresponding to the transmission pulse wave (transmission wave) transmitted from the wave transmitter 11 to the transmission fan-shaped space T1 can be received by the reception fan-shaped space R1 of the wider second receiving width Rθ2, after the sufficient time from the start of the transmission of the transmission pulse wave. As a result, compared with the configuration in which the signals received by the reception fan-shaped space R1 are increased simply by widening the second transmitting width Tθ2 of the transmission fan-shaped space T1, the second transmitting width Tθ2 of the transmission fan-shaped space T1 can be narrowed. By narrowing the second transmitting width Tθ2, since the transmission pulse wave can reach a more distant location, the reduction in the maximum detection range can be prevented. Further, even if the second transmitting width Tθ2 of the transmission fan-shaped space T1 is narrowed, since the reception wave can promptly be received, the transmitting cycle of the transmission fan-shaped space T1, i.e., the updating cycle of the detection result image can further be shortened. As a result, the underwater detection apparatus 1 capable of achieving both the speed-up of the updating cycle of the detection result image and the prevention of the reduction in the detection range can be achieved.

Moreover, according to the underwater detection apparatus 1, the second transmitting width Tθ2 of the transmission fan-shaped space T1 can greatly be narrowed compared with the conventional underwater detection apparatus. As a result, since the wave transmission sensitivity of the wave transmitter 11 can be increased, the detection range can further be expanded. Further, since the second transmitting width Tθ2 is narrow, drive time of the wave transmitter 11 can further be shortened. As a result, amount of heat resulting from the transmitting operation can further be lessened.

Moreover, according to the underwater detection apparatus 1, when the motor 16 rotates in the first direction K1, the transmission fan-shaped space T1 may be located forward or front side in the first direction K1 in the reception fan-shaped space R1 in the second plane P2. With this configuration, the transmission fan-shaped space T1 can be disposed forward or front side in the rotating direction of the motor 16 in the reception fan-shaped space R1. As a result, the second transmitting width Tθ2 of the transmission fan-shaped space T1 can further be narrowed, while more reliably suppressing occurrence of reception leakage of the transmission pulse wave in the reception fan-shaped space R1.

Moreover, according to the underwater detection apparatus 1, the motor 16 may rotate the wave receiver 13 in the direction perpendicular to the plane in which the beam forming is performed. Therefore, the underwater three-dimensional range can be detected appropriately.

First Modification of First Embodiment

Figure 6:
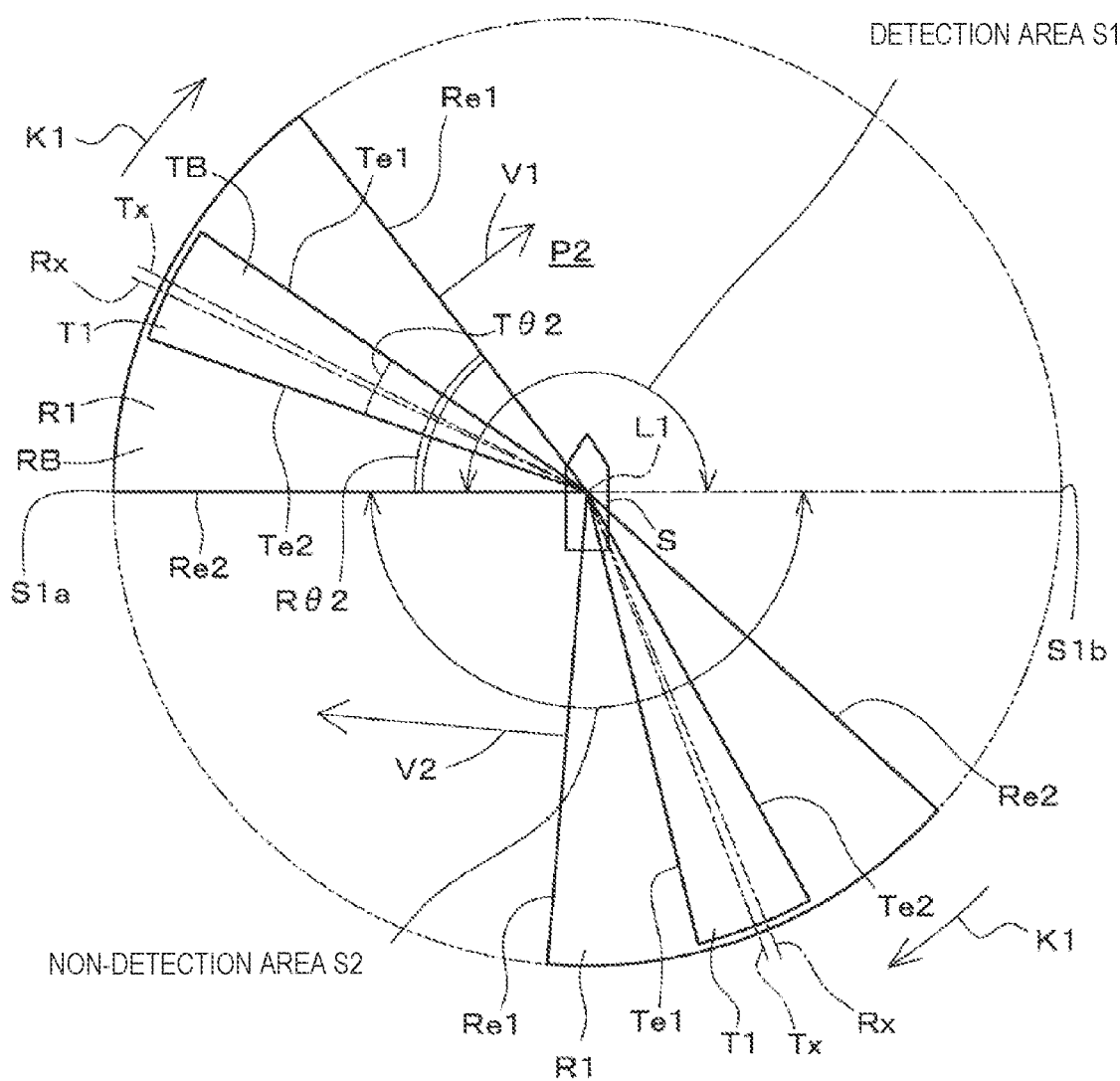
FIG. 6 is a plan view schematically illustrating a substantial part of a first modification of the first embodiment.

FIG. 6 is a plan view schematically illustrating a substantial part of a first modification of the first embodiment. Note that, below, differences from the above embodiment will mainly be described. Like reference characters are denoted in the figures to similar configurations as this embodiment to omit the detailed description.

In the first embodiment, the rotating direction of the motor 16 may be fixed in the first direction K1. The underwater detection may be performed by the underwater detection apparatus 1 in all the ranges about the rotation axis L1. However, the underwater detection may be performed only in a partial range about the rotation axis L1 (e.g., a sector range of 90° or 180°. In such a case, if the motor 16 rotates also in the non-detecting range about the rotation axis L1 similarly to the detection range, a dead time may occur. A configuration for shortening such a dead time may be adopted in this first modification of the first embodiment. That is, a configuration for increasing the image update cycle may be adopted.

Referring to FIGS. 1 and 6, according to the configuration in the first modification of the first embodiment, the underwater detection apparatus 1 may increase the rotating speed of the motor 16 in a non-detecting mode other than when displaying the image in a sector detecting mode. Thus, the image update cycle in this modification can be increased more than the image update cycle during all-direction detection.

In this modification, (1) in the sector detecting mode, the motor 16 may rotate at a first speed V1 to mechanically scan a detection area S1→(2) in the non-detecting mode, the motor 16 may rotate at a second speed V2 faster than the first speed V1 (at this time, the image is not updated)→(1)→(2) may be repeated.

In the following, otherwise described in particular, a state where the second plane P2 is seen from above as illustrated in FIG. 6 is described. In this modification, the detection area S1 and a non-detection area S2 may be set. Data indicative of the detection area S1 and the non-detection area S2 may be stored in the memory etc. of the signal processor 3. One or more kinds of detection area S1 may be set when the underwater detection apparatus 1 is shipped out from a factory, or may be arbitrarily set by the user of the underwater detection apparatus 1.

For example, in this modification, the detection area S1 and the non-detection area S2 may be each set so as to extend in a range of 180° about the rotation axis L1. The controller 31 may perform the same detection as described in the first embodiment when the underwater detection is performed in the detection area S1. On the other hand, the controller 31 may rotate the motor 16 but suspend the image data generation when not detecting in the non-detection area S2.

In this modification illustrated in FIG. 6, the rotating direction of the motor 16 may be the first direction K1 and it may be fixed. The controller 31 may rotate the motor 16 in the first direction K1 at the given first speed V1 when the underwater detection is performed using the wave transceiving unit 5 (i.e., when the underwater detection is performed by the wave transmitter 11 and the wave receiver 13), and rotate the motor 16 at the second speed V2 faster than the first speed V1 when the underwater detection is not performed.

Figure 7:
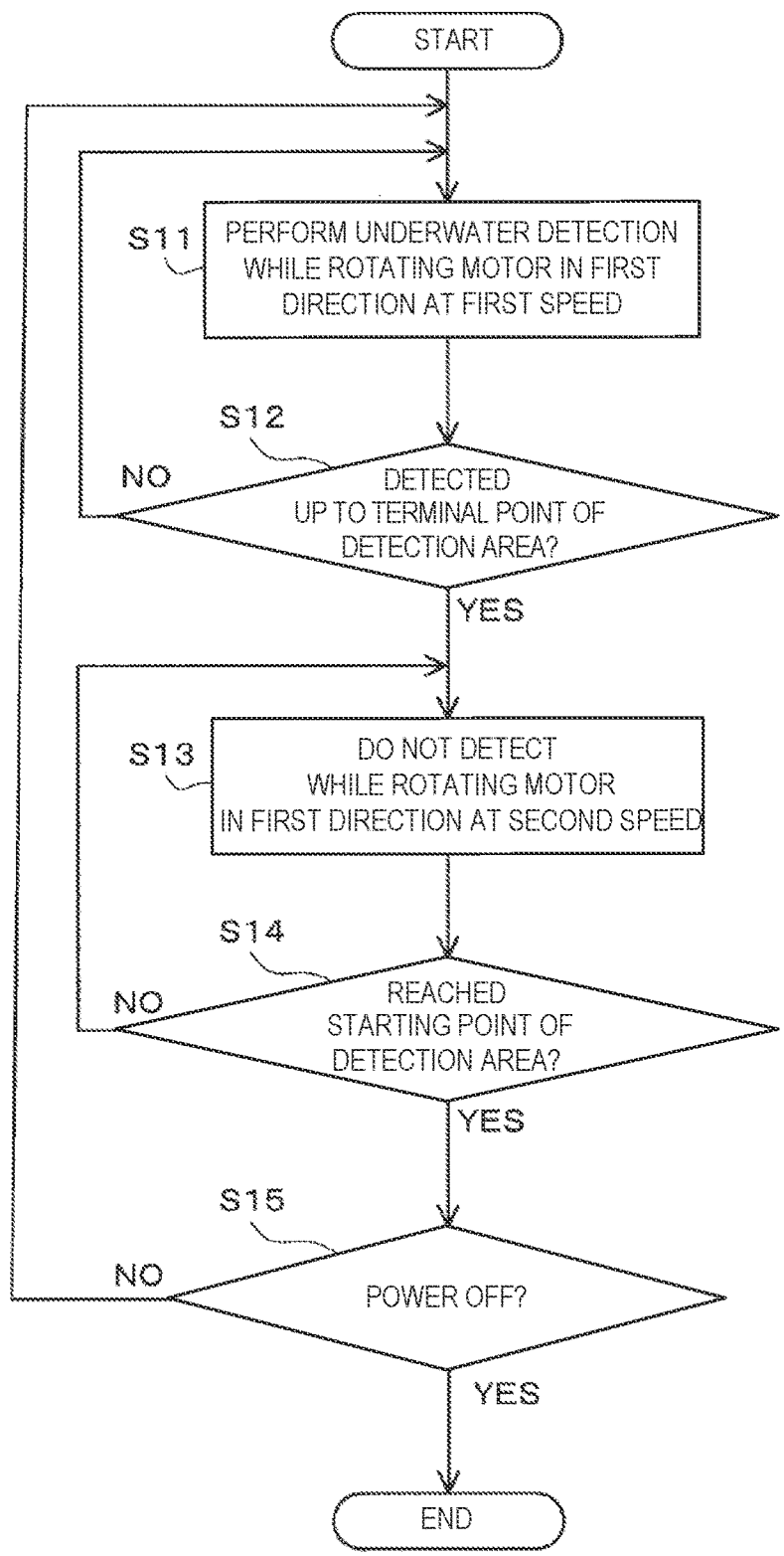
FIG. 7 is a flowchart illustrating one example of processing in the first modification of the first embodiment illustrated in FIG. 6.

FIG. 7 is a flowchart illustrating one example of processing in the first modification of the first embodiment illustrated in FIG. 6. Below, a case where the detection is performed from a starting point S1a of the detection area S1 is described as one example. Referring to FIGS. 1, 6, and 7, the controller 31 may perform the detection control, while rotating the motor 16 in the first direction K1 at the first speed V1 by controlling the motor 16 etc. (Step S11). Therefore, the transmission pulse wave may be transmitted from the wave transmitter 11 to the transmission fan-shaped space T1, and the reflection wave in the reception fan-shaped space R1 is received by the wave receiver 13 as the reception wave.

Then, the controller 31 may refer to the rotational position of the motor 16 indicated by the rotational angle detecting part 18 and determine whether the detection is performed up to a terminal point S1*b* of the detection area S1 in the first direction K1 (Step S12). If the detection has not yet performed up to the terminal point S1*b* of the detection area S1 (NO at Step S12), the control at Step S11 may be repeated. On the other hand, if the detection is performed up to the terminal point S1*b* of the detection area S1 (YES at Step S12), the controller 31 may go into the non-detecting mode (Step S13). In the non-detecting mode, for example, the controller 31 may rotate the motor 16 in the first direction K1 at the second speed V2 faster than the first speed V1, and suspend the image data generation (Step S13).

Note that, in the non-detecting mode, the transmission pulse wave may be or may not be transmitted from the wave transmitter 11. Moreover, in the non-detecting mode, the reception may be or may not be performed by the wave receiver 13. The operation patterns of the wave transmitter 11 and the wave receiver 13 in the non-detecting mode may be the following four patterns. That is, the patterns may be (1) the wave receiver 13 is ON when the wave transmitter 11 is turned ON, (2) the wave receiver 13 is OFF when the wave transmitter 11 is turned ON, (3) the wave receiver 13 is ON when the wave transmitter 11 is turned OFF, and (4) the wave receiver 13 is OFF when the wave transmitter 11 is turned OFF.

The controller 31 may repeat the control at Step S13 until the motor 16, the wave transmitter 11, and the wave receiver 13 reach the starting point S1*a* of the detection area S1 about the rotation axis L1 (NO at Step S14), while referring to the rotational position of the motor 16 indicated by the rotational angle detecting part 18. That is, the non-detecting mode at Step S13 may be maintained. Then, if the motor 16, the wave transmitter 11, and the wave receiver 13 reach to the starting point S1*a* of the detection area S1 about the rotation axis L1 (YES at Step S14), unless the power of the underwater detection apparatus 1 is turned OFF (NO at Step S15), the processings at and after Step S11 may be repeated.

As described above, according to the first modification of the first embodiment, the motor 16 may rotate at the first speed V1 when the underwater detection is performed, and the motor 16 may rotate at the second speed V2 faster than the first speed V1 when the underwater detection is not performed. According to this configuration, the underwater detection apparatus 1 can secure a sufficient time for receiving the reception wave when the underwater detection is performed, and quickly return the wave transmitter 11 and the wave receiver 13 back into the detection area S1 when the detection is not performed. As a result, the updating cycle of the detection result image can be speeded up.

Moreover, according to the first modification of the first embodiment, the controller 31 may rotate the motor 16 in the first direction K1 both when the underwater detection is performed and when the underwater detection is not performed. According to this configuration, since it is not necessary to change the rotating direction of the motor 16 between when the underwater detection is performed and when the detection is not performed, the load of the motor 16 can be lowered. Moreover, the rotating speed of the motor 16 can be changed more quickly between the first speed V1 and the second speed V2.

Moreover, according to the first modification of the first embodiment, the transmission fan-shaped space T1 may be located in the reception fan-shaped space R1. Moreover, the controller 31 may rotate the motor 16 at the first speed V1 when the underwater detection is performed, and rotate the motor 16 at the second speed V2 faster than the first speed V1 when the underwater detection is not performed. According to this configuration, the updating cycle of the detection result image can be speeded up, while suppressing reception leakage of the transmission wave in the reception fan-shaped space R1.

Second Modification of First Embodiment

Figure 8:
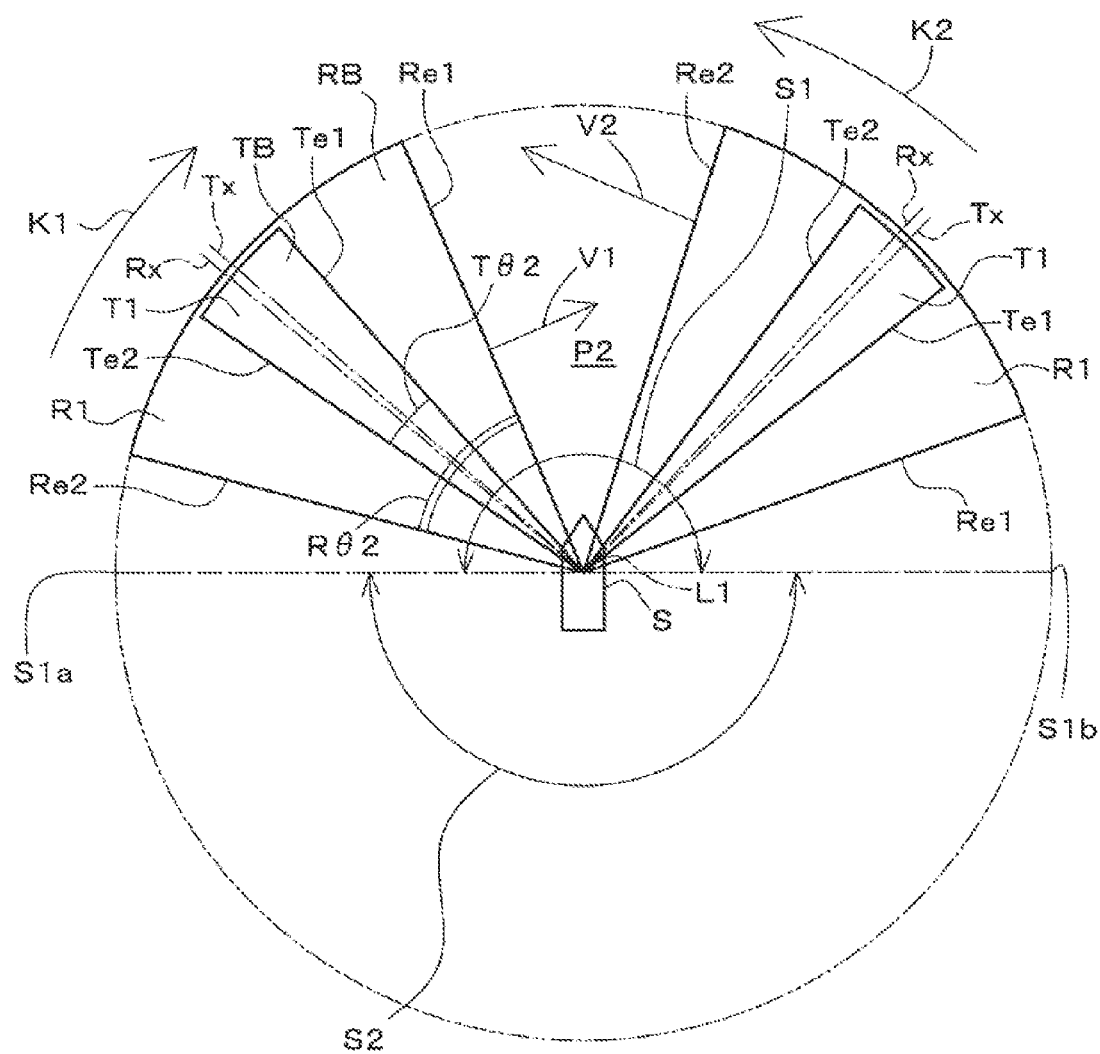
FIG. 8 is a plan view schematically illustrating a substantial part of a second modification of the first embodiment.

FIG. 8 is a plan view schematically illustrating a substantial part of a second modification of the first embodiment. Note that, below, a difference from the above embodiment and the modification will mainly be described, and like reference characters are denoted in the figures to similar configurations as this embodiment and the modification to omit the detailed description.

The difference of the second modification of the first embodiment from the first modification of the first embodiment is that the controller 31 rotates the motor 16 in the first direction K1 at the first speed V1 during the underwater detection when the underwater detection is performed in the detection area S1, and rotates the motor 16 in a second direction K2 opposite from the first direction K1 at the second speed V2 during the non-detection when the underwater detection is not performed.

Figure 9:
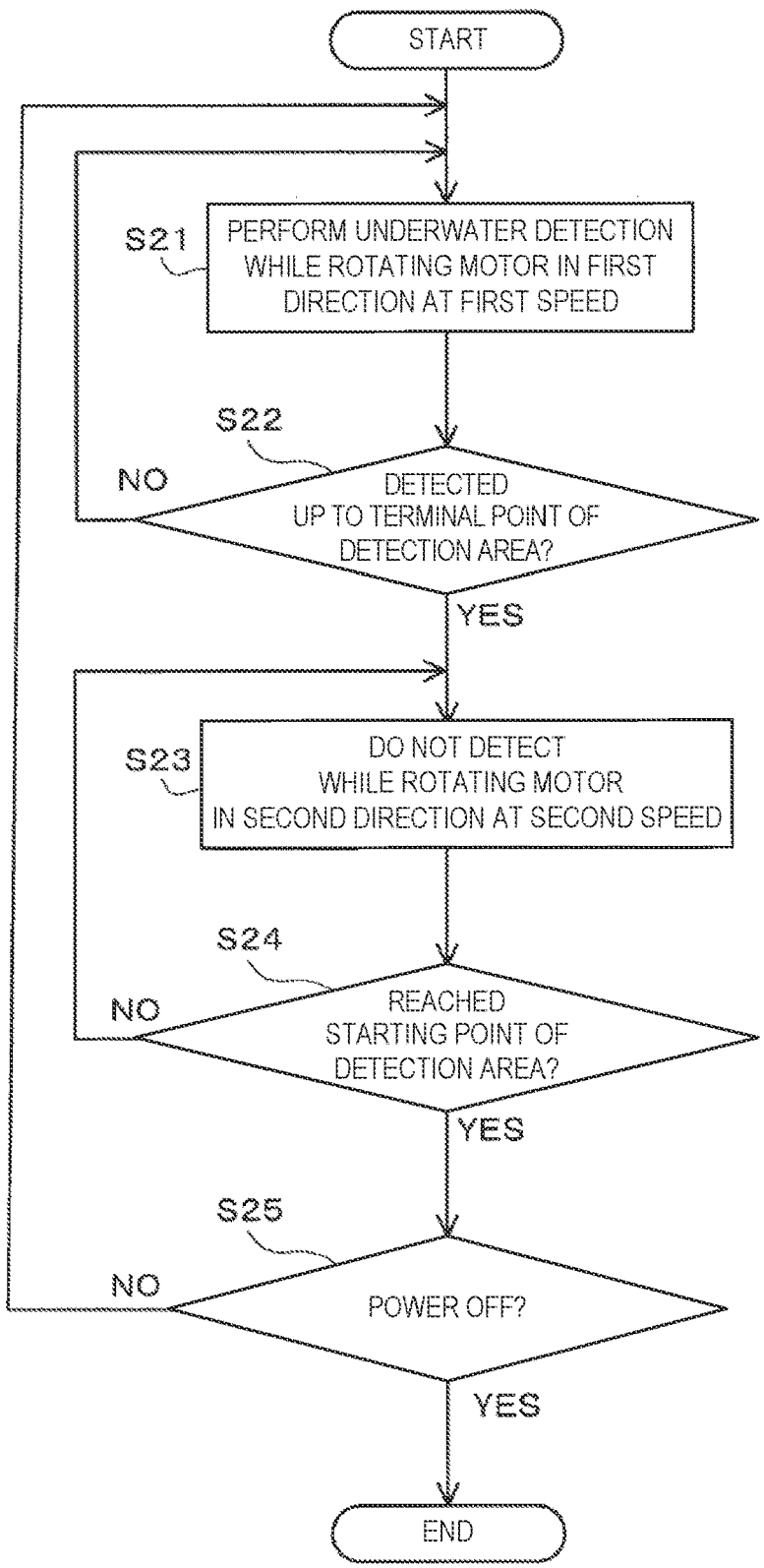
FIG. 9 is a flowchart illustrating one example of processing in the second modification of the first embodiment illustrated in FIG. 8.

FIG. 9 is a flowchart illustrating one example of processing in the second modification of the first embodiment illustrated in FIG. 8. Below, a case where the detection is performed from the starting point S1*a* of the detection area S1 is described as one example. Referring to FIGS. 1, 8, and 9 the controller 31 may perform the detection control, while rotating the motor 16 in the first direction K1 at the first speed V1 (Step S21). This control is the same as the control at Step S11.

Then, the controller 31 may refer to the rotational position of the motor 16 indicated by the rotational angle detecting part 18, and determine whether the detection is performed about the rotation axis L1 up to the terminal point S1*b* of the detection area S1 (Step S22). If the detection has not yet performed up to the terminal point S1*b* of the detection area S1 (NO at Step S22), the control at Step S21 may be repeated. On the other hand, if the detection is performed up to the terminal point S1*b* of the detection area S1 (YES at Step S22), the controller 31 may go into the non-detecting mode while rotating the motor 16 in the second direction K2 opposite from the first direction K1 at the second speed V2 faster than the first speed V1 (Step S23). The operations of the wave transmitter 11 and the wave receiver 13 may be the same as operations described at Step S13.

The controller 31 may refer to the rotational position of the motor 16 indicated by the rotational angle detecting part 18, and repeat the control at Step S23 until the motor 16, the wave transmitter 11, and the wave receiver 13 reach the starting point S1*a* of the detection area S1 about the rotation axis L1 (NO at Step S24). Then, if the motor 16, the wave transmitter 11, and the wave receiver 13 reach the starting point S1*a* of the detection area S1 about the rotation axis L1 (YES at Step S24), the processings at and after Step S21 may be repeated, unless the power of the underwater detection apparatus 1 is turned OFF (NO at Step S25).

As described above, according to the second modification of the first embodiment, in the non-detecting mode, the motor 16 may rotate in the second direction K2 opposite from the first direction K1, unlike the first modification of the first embodiment. With this configuration, the motor 16 may rotate so as to oscillate within an angle range of 360°.

Therefore, the slip ring for continuously rotating the motor 16 in the same direction may become unnecessary.

Second Embodiment

Figure 10:
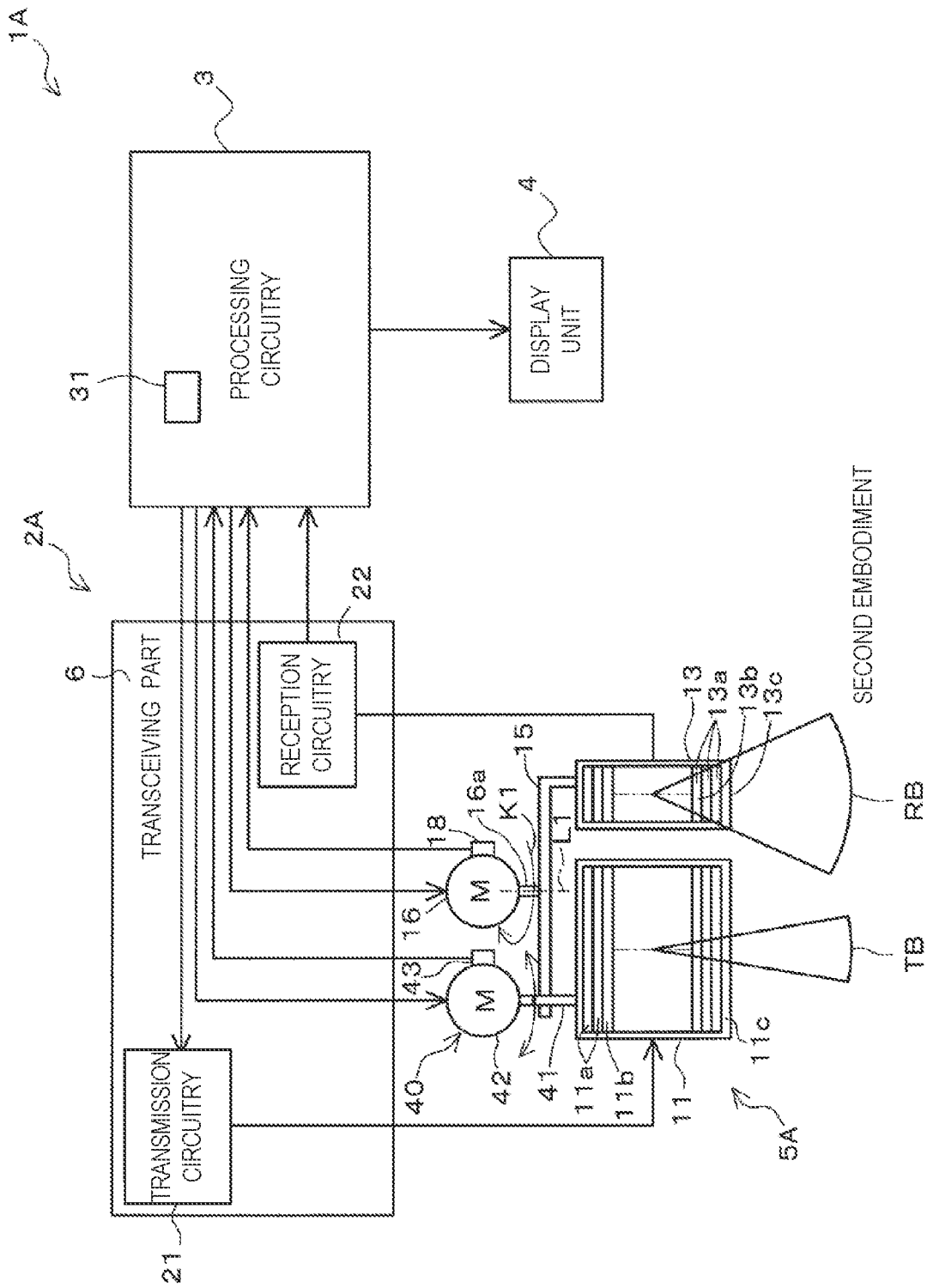
FIG. 10 is a block diagram illustrating a configuration of an underwater detection apparatus according to a second embodiment of the present disclosure.
Figure 11A:
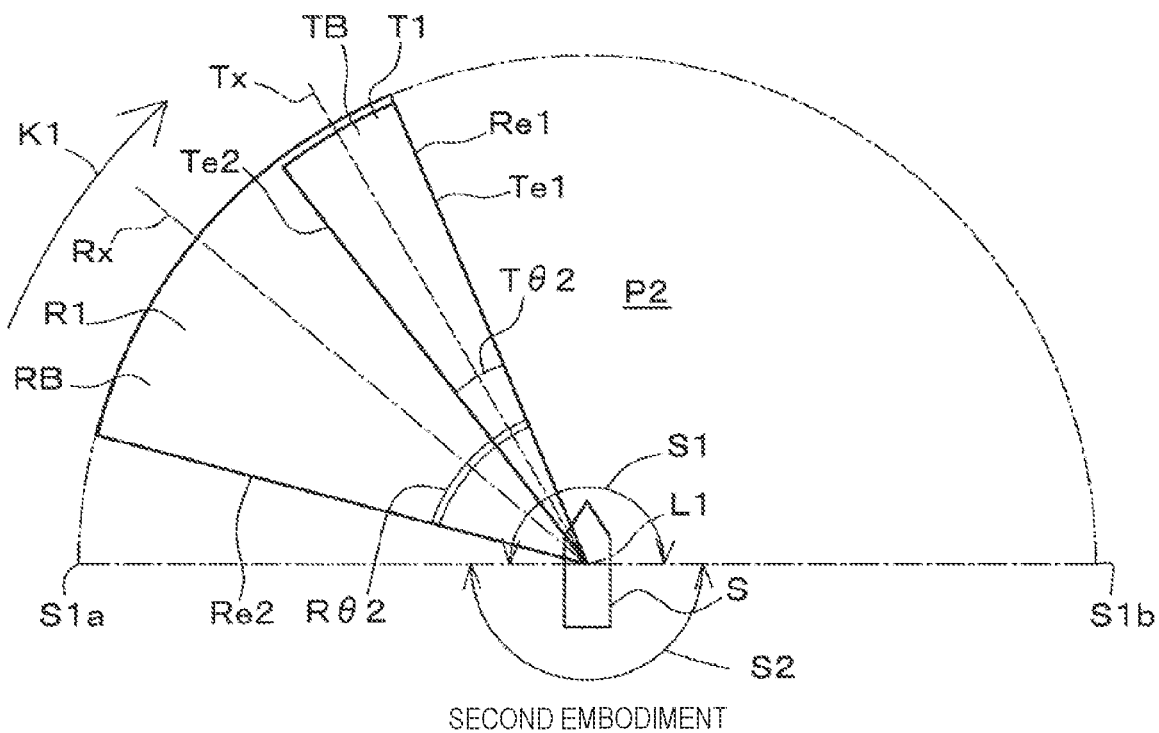
FIGS. 11A and 11B are plan views of the ship to which the underwater detection apparatus is mounted, seen in a direction perpendicular to the second plane perpendicular to a first plane, and schematically illustrate a transmission fan-shaped space and a reception fan-shaped space, where
Figure 11B:
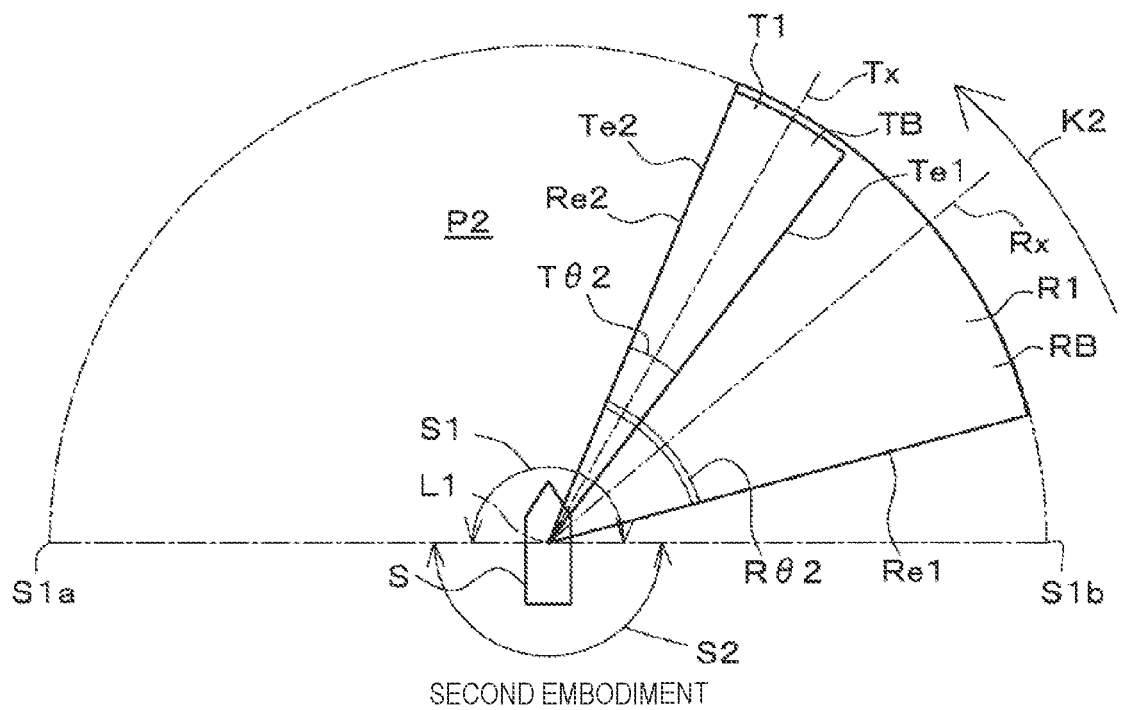

FIG. 10 is a block diagram illustrating a configuration of an underwater detection apparatus 1A according to a second embodiment of the present disclosure. FIGS. 11A and 11B are plan views of the ship S to which the underwater detection apparatus 1A is mounted, seen from a direction perpendicular to the second plane P2 perpendicular to the first plane P1, where the transmission fan-shaped space T1 and the reception fan-shaped space R1 are schematically illustrated. FIG. 11A illustrates a state where the wave transmitter 11 and the wave receiver 13 are rotated in the first direction K1, and FIG. 11B illustrates a state where the wave transmitter 11 and the wave receiver 13 are rotated in the second direction K2.

Referring to FIGS. 10 to 11B, a difference of the underwater detection apparatus 1A from the underwater detection apparatus 1 of the first embodiment is that the motor 16 rotates both in the first direction K1 and the second direction K2 opposite from the first direction K1 during the underwater detection. That is, the underwater detection apparatus 1A can perform the underwater detection, while rotating a wave transceiving unit 5A in the first direction K1, and can perform the underwater detection, while rotating the wave transceiving unit 5A in the second direction K2. Further, the second embodiment may be configured so that the direction of the transmission fan-shaped space T1 with respect to the reception fan-shaped space R1 (in other words, the position of the transmission fan-shaped space T1 with respect to the reception fan-shaped space R1) is changed, when the rotating direction of the motor 16 is reversed.

The underwater detection apparatus 1A may include a direction change mechanism 40, in addition to the configuration of the underwater detection apparatus 1. In detail, the underwater detection apparatus 1A may include a transceiving device 2A, the signal processor 3, and the display unit 4.

The transceiving device 2A may include a wave transceiving unit 5A and the transceiving part 6.

The wave transceiving unit 5A may include the wave transmitter 11, the wave receiver 13, the bracket 15, the motor 16 as the rotary driving part, the rotational angle detecting part 18, and the direction change mechanism 40.

The direction change mechanism 40 may change the direction of the transmission fan-shaped space T1 with respect to the reception fan-shaped space R1 in the second plane P2. The direction change mechanism 40 may change the direction of the transmission fan-shaped space T1 so as to be interlocked with the change in the rotating direction of the motor 16 about the rotation axis L1 to shift the position of the transmission fan-shaped space T1 in the second plane P2 rearward or backward in the rotating direction before the change in the rotating direction. That is, the direction change mechanism 40 may change the direction of the transmission fan-shaped space T1 so as to be interlocked with the change in the rotating direction of the motor 16 to shift the position of the transmission fan-shaped space T1 in the second plane P2 from the forward half or front half side of the reception fan-shaped space R1 to the rearward half or back half side in the rotating direction before the change in the rotating direction.

The direction change mechanism 40 may include a pivot 41 which supports the wave transmitter 11 so that the direction of the wave transmitter 11 with respect to the wave receiver 13 is changeable, and a direction change motor 42 which changes the direction of the wave transmitter 11 around the pivot 41.

The pivot 41 may be a shaft part extending in the longitudinal direction of the wave transmitter 11, i.e., a direction in which the plurality of wave transmission elements 11a are lined up, may be supported by the bracket 15, and may rotatably support the wave transmitter 11 in the oscillating direction around the pivot 41.

The direction change motor 42 may be a motor of which the rotational position is controllable, such as a stepping motor, a servo motor, etc., and may be connected to the controller 31 of the signal processor 3. The direction change motor 42 may include a casing supported by the bracket 15, and an output shaft which extends from the casing and may be coupled to the pivot 41 directly or through a reduction mechanism (not illustrated) so that the power is transferable to the pivot 41. With this configuration, the direction change motor 42 can change the direction of the wave transmitter 11 around the pivot 41.

A rotational angle detecting part 43 may be attached to the direction change motor 42, and the rotational angle detecting part 43 may be connected to the controller 31. For example, an encoder is used as the rotational angle detecting part 43. However, without being limited to this configuration, the signal for controlling the rotation of the direction change motor 42 may be analyzed and the signal may be converted into angular information. In detail, if the stepping motor is used as the direction change motor 42, the number of instruction pulses inputted into the stepping motor may be counted, and the count may be converted into the angular information. In the underwater detection apparatus 1A, the direction of the wave transmitter 11 with respect to the wave receiver 13 in the second plane P2 may be calculated based on the rotational angle of the direction change motor 42 detected by the rotational angle detecting part 43. The direction change motor 42 may be controlled by the controller 31 of the signal processor 3.

The controller 31 may output an instruction signal to the direction change motor 42 to control the operation of the direction change motor 42. The controller 31 may set a target angle value of the output shaft of the direction change motor 42. Then, the controller 31 may detect the rotational position of the output shaft of the direction change motor 42 by the rotational angle detecting part 43, and control the direction change motor 42 so that a deviation of the detected value from the target output value becomes zero.

Figure 12:
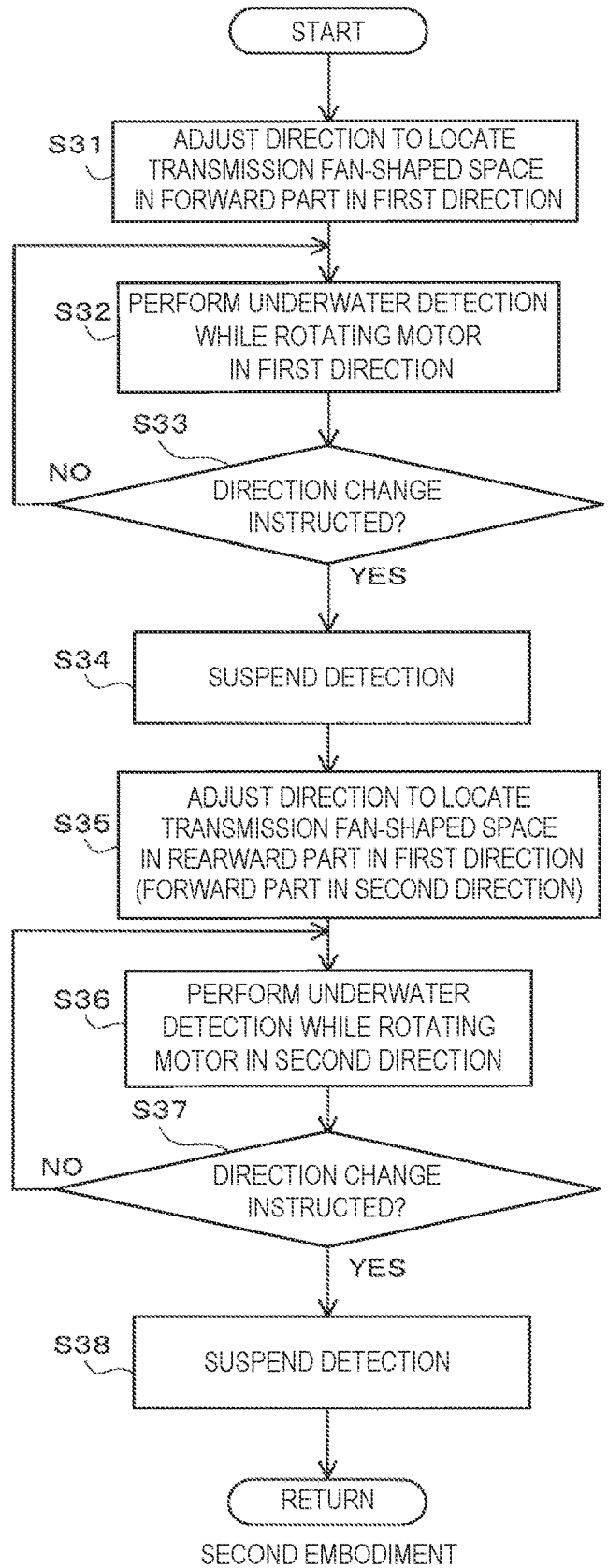
FIG. 12 is a flowchart illustrating one example of processing in the second embodiment.

FIG. 12 is a flowchart illustrating one example of processing in the second embodiment. Referring to FIGS. 10 to 12, first, a case where the underwater detection is performed by rotating the wave transmitter 11 and the wave receiver 13 in the first direction K1 is considered. In this case, the direction of the wave transmitter 11 with respect to the wave receiver 13 may be set by the controller 31 controlling the direction change motor 42 so that the transmission fan-shaped space T1 is located in a forward part or front side part (i.e., the forward half or front half side) of the reception fan-shaped space R1 in the first direction K1 (Step S31). At this time, the transmission fan-shaped space T1 and the reception fan-shaped space R1 are, for example, as illustrated in FIG. 11A, and may be the same as the further modification of the first embodiment (the modification illustrated in FIG. 4C). Note that, at this time, the relation between the transmission fan-shaped space T1 and the reception fan-shaped space R1 may be the relation illustrated in FIG. 4A, or may be the relation illustrated in FIG. 4B.

Next, the controller 31 may control the transmitting part 21 and the receiving part 22 while rotating the motor 16 in the first direction K1 to emit the transmission pulse wave and receive the reception wave while rotating the wave transmitter 11 and the wave receiver 13 in the first direction K1. That is, the underwater detection by the underwater detection apparatus 1A may be performed (Step S32).

Until the controller 31 receives a direction change instruction, for example, by a given time being lapsed or receiving an instruction from the operator of the underwater detection apparatus 1A (NO at Step S33), the controller 31 may perform the underwater detection, while rotating the motor 16 in the first direction K1 (Step S32).

On the other hand, if the controller 31 detects the direction change instruction (YES at Step S33), it may suspend the underwater detection (Step S34). In detail, the controller 31 may suspend the image data generation by the signal processor 3, while suspending the rotation of the motor 16.

Next, the controller 31 may set the direction of the wave transmitter 11 with respect to the wave receiver 13 by controlling the direction change motor 42 so that the transmission fan-shaped space T1 is located in a rearward part (i.e., the rearward half) of the reception fan-shaped space R1 in the first direction K1, i.e., the transmission fan-shaped space T1 is located in a forward part or front part (i.e., the forward half or front half side) of the reception fan-shaped space R1 in the second direction K2 (Step S35). At this time, the transmission fan-shaped space T1 and the reception fan-shaped space R1 are, for example, as illustrated in FIG. 11B. In detail, a relative position of the transmission fan-shaped space T1 and the reception fan-shaped space R1 may be set so that the second transmission edge Te2 of the transmission fan-shaped space T1 and the second reception edge Re2 of the reception fan-shaped space R1 are overlapped with each other. Thus, the direction change mechanism 40 may change the direction of the transmission fan-shaped space T1 so as to be interlocked with the change in the rotating direction of the motor 16 to shift the position of the transmission fan-shaped space T1 in the second plane P2 to the trailing edge side in the rotating direction of the reception fan-shaped space R1 before the rotating direction is changed. Note that the configuration of the direction change mechanism 40 is not limited to the configuration in which the position of the transmission fan-shaped space T1 in the second plane P2 is shifted to the trailing edge side of the reception fan-shaped space R1 in the rotating direction before the change in the rotating direction. The direction change mechanism 40 may have any configuration as long as the position of the transmission fan-shaped space T1 in the second plane P2 is shifted to the rearward half or back half side from the forward half or front half side of the reception fan-shaped space R1 in the rotating direction before the change in the rotating direction.

Next, again referring to FIGS. 10 to 12, the controller 31 may control the transmitting part 21, while rotating the motor 16 in the second direction K2 to emit the transmission pulse wave and receive the reception wave, while rotating the wave transmitter 11 and the wave receiver 13 in the second direction. That is, the underwater detection by the underwater detection apparatus 1A may be performed (Step S36).

Similar to the configuration described above, until the controller 31 detects the direction change instruction (NO at Step S37), it may perform the underwater detection, while rotating the wave transmitter 11 and the wave receiver 13 in the second direction K2 (Step S36).

On the other hand, if the controller 31 detects the direction change instruction (YES at Step S37), it may suspend the underwater detection (Step S38). In detail, the controller 31 may suspend the image data generation by the signal processor 3 while suspending the rotation of the motor 16. Next, the processings at and after Step S31 may be repeated.

As described above, with the underwater detection apparatus 1A according to the second embodiment, the direction change mechanism 40 may be provided. Thus, both when the wave transmitter 11 and the wave receiver 13 are rotated in the first direction K1 and when they are rotated in the second direction K2, the relative spatial relationship between the transmission fan-shaped space T1 and the reception fan-shaped space R1 can be maintained similarly. Moreover, the rotating direction of the wave transmitter 11 and the wave receiver 13 may not be only one of the first direction K1 and the second direction K2. Therefore, it is not necessary to use the slip ring required when the rotating direction of the motor 16 is fixed.

Note that, although the second embodiment is described as the direction of the wave transmitter 11 being changed by the direction change motor 42, this configuration may be altered. For example, the wave receiver 13 may be rotatable around a pivot similar to the pivot 41, and the direction of the wave receiver 13 may be changed by the direction change motor 42. At least one of the wave transmitter 11 and the wave receiver 13 may be changed in the direction by the direction change motor 42.

First Modification of Second Embodiment

In the second embodiment, the direction change motor 40 may be omitted, a friction generating member, such as a collar made of resin, may be provided between the pivot 41 and the casing 11c of the wave transmitter 11, and a stop which regulates an amount of rotation of the wave transmitter 11 around the pivot 41 within a fixed range may be provided. In this case, when the motor 16 changes the rotating direction to the opposite direction, the output shaft 16a of the motor 16 may be driven so that inertia above a given value may occur in the wave transmitter 11 around the pivot 41. Therefore, similar to the second embodiment, the direction of the wave transmitter 11 with respect to the wave receiver 13 can be changed by the inertia.

Although in the first modification of this second embodiment the direction of the wave transmitter 13 is changed by the inertia, the configuration may be altered. For example, the wave receiver 13 may be rotatable around a pivot similar to the pivot 41, and the direction of the wave receiver 13 may be changed by the inertia. At least one of the wave transmitter 11 and the wave receiver 13 may be changed in the direction by the inertia.

Second Modification of Second Embodiment

Figure 13:
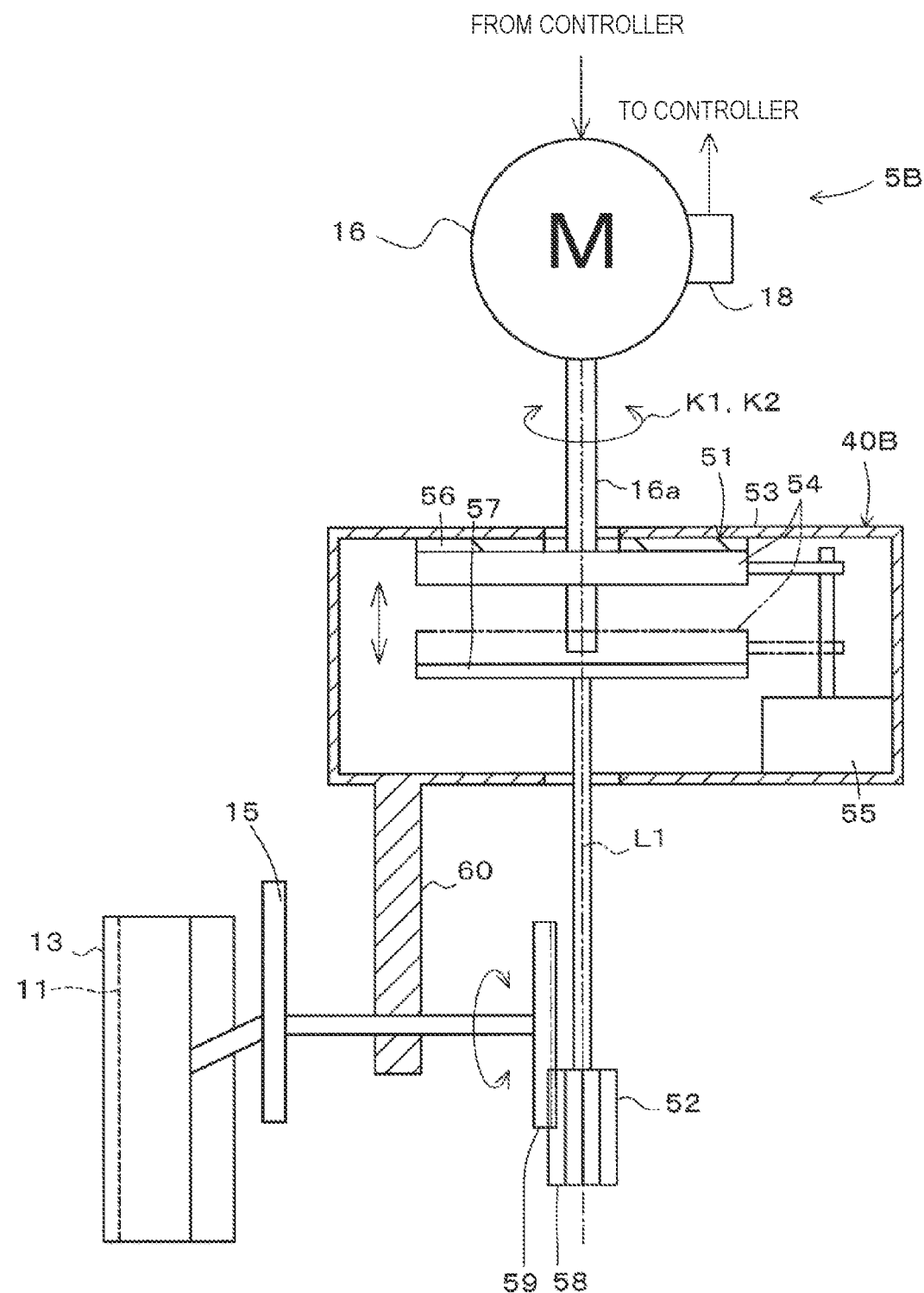
FIG. 13 is a side view schematically illustrating a substantial part of a second modification of the second embodiment, where a part is illustrated in a cross-section.

FIG. 13 is a side view schematically illustrating a substantial part of a second modification of the second embodiment, and a part thereof is illustrated in a cross-section. In the second modification of the second embodiment, the direction of the transmission fan-shaped space T1 with respect to the reception fan-shaped space R1 may be changed by rotating the entire of the wave transmitter 11 and the wave receiver 13.

In detail, a wave transceiving unit 5B may be provided, instead of the wave transceiving unit 5 illustrated in the first embodiment. The wave transceiving unit 5B may include the wave transmitter 11, the wave receiver 13, the bracket 15 which supports the wave transmitter 11 and the wave receiver 13, the motor 16 as the rotary driving part, the rotational angle detecting part 18, and a direction change mechanism 40B.

The direction change mechanism 40B may include the motor 16, a power distribution mechanism 51, and a rotating mechanism 52.

In the second embodiment, the motor 16 may constitute a part of the direction change mechanism 40B. The output shaft 16a of the motor 16 may be coupled to the power distribution mechanism 51.

The power distribution mechanism 51 may be provided in order to distribute the output of the motor 16 selectively to power for the underwater detection and power for reversing the direction of the wave transmitter 11 and the wave receiver 13. The power distribution mechanism 51 may include a casing 53, a driving member 54 accommodated in the casing 53, an actuator 55 which is supported by the casing 53 and displaces the driving member 54, a first follower member 56 fixed to the inside of the casing 53, and a second follower member 57 accommodated in the casing 53.

The casing 53 may be a member which is formed in a hollow box and is supported rotatably about the rotation axis L1 by a support member (not illustrated). The output shaft 16a of the motor 16 may penetrate the casing 53, and may be rotatable relatively to the casing 53.

For example, the driving member 54 is a clutch disk where friction members are formed on the front surface and the back surface thereof. For example, an inner spline is formed at the center of the driving member 54, and the inner spline may fit onto an outer spline formed on the output shaft 16a of the motor 16. Therefore, the driving member 54 may be integrally rotatable with the output shaft 16a and may be relatively displaceable in the axial direction of the output shaft 16a.

The actuator 55 may displace the driving member 54 in the axial direction of the output shaft 16a to switch between a state where the driving member 54 and the first follower member 56 are coupled so as to integrally be rotatable, and a state where the driving member 54 and the second follower member 57 are coupled so as to integrally be rotatable. The actuator 55 may have a configuration in which a ball-screw mechanism is attached to an electric motor. The actuator 55 may be driven and controlled by the controller 31 of the signal processor 3.

The first follower member 56 is, for example, a metal member of a disk shape which is fixed to the casing 53 and may be integrally rotatable with the casing 53. The first follower member 56 and the driving member 54 may face each other in the axial direction of the output shaft 16a. The second follower member 57 is, for example, a metal member of a disk shape. The second follower member 57 and the driving member 54 may face each other in the axial direction of the output shaft 16a. The second follower member 57 may be coupled to a drive gear part 58 of the rotating mechanism 52.

The rotating mechanism 52 may be provided in order to rotate the wave transmitter 11 and the wave receiver 13 horizontally or with some angle from the horizontal plane. The rotating mechanism 52 may be an intersecting axis gear mechanism, and may include the drive gear part 58 fixed to the first follower member 56, and a follower gear part 59 fixed to the bracket 15.

The drive gear part 58 may be formed in a shaft shape, and may be rotatably supported by the casing 53 through a bearing (not illustrated) about the rotation axis L1. The second follower member 57 may be coupled to an upper end of the drive gear part 58 so as to be integrally rotatable. A gear may be provided to a lower end of the drive gear part 58.

The follower gear part 59 may have a gear which meshes with the gear of the drive gear part 58. The axis of the drive gear part 58 may intersect with the axis of the follower gear part 59, and the axis of the follower gear part 59 may extend horizontally or at an inclination angle near the horizontal direction.

The bracket 15 may be rotatably supported about the axis of the follower gear part 59 through a stay 60 fixed to the casing 53 and a bearing (not illustrated).

With the above configuration, when the wave transmitter 11 and the wave receiver 13 rotate about the rotation axis L1 for the underwater detection, the actuator 55 may couple the driving member 54 to the first follower member 56 as illustrated by solid lines. Therefore, the driving member 54, the first follower member 56, the casing 53, the stay 60, the bracket 15, the wave transmitter 11, and the wave receiver 13 may rotate about the rotation axis L1 integrally with the output shaft 16a of the motor 16.

On the other hand, when the rotating direction about the rotation axis L1 is reversed, the actuator 55 may couple the driving member 54 to the second follower member 57 as illustrated by two-dot chain lines which are imaginary lines. Therefore, the casing 53 may not rotate about the rotation axis L1, the drive gear part 58 may rotate with the rotation of the output shaft 16a of the motor 16, and the follower gear part 59 may rotate. As a result, the bracket 15, the wave transmitter 11, and the wave receiver 13 may rotate about the rotation axis of the follower gear part 59. Therefore, the spatial relationship of the transmission fan-shaped space T1 and the reception fan-shaped space R1 can be achieved, similarly to the second embodiment.

Note that, when the wave transmitter 11 and the wave receiver 13 rotate in the first direction K1 and when they rotate in the second direction K2, the direction change mechanism 40B may have the configuration with the same relative spatial relationship of the transmission fan-shaped space T1 and the reception fan-shaped space R1, without being limited to the above configuration.

Third Embodiment

Figure 14:
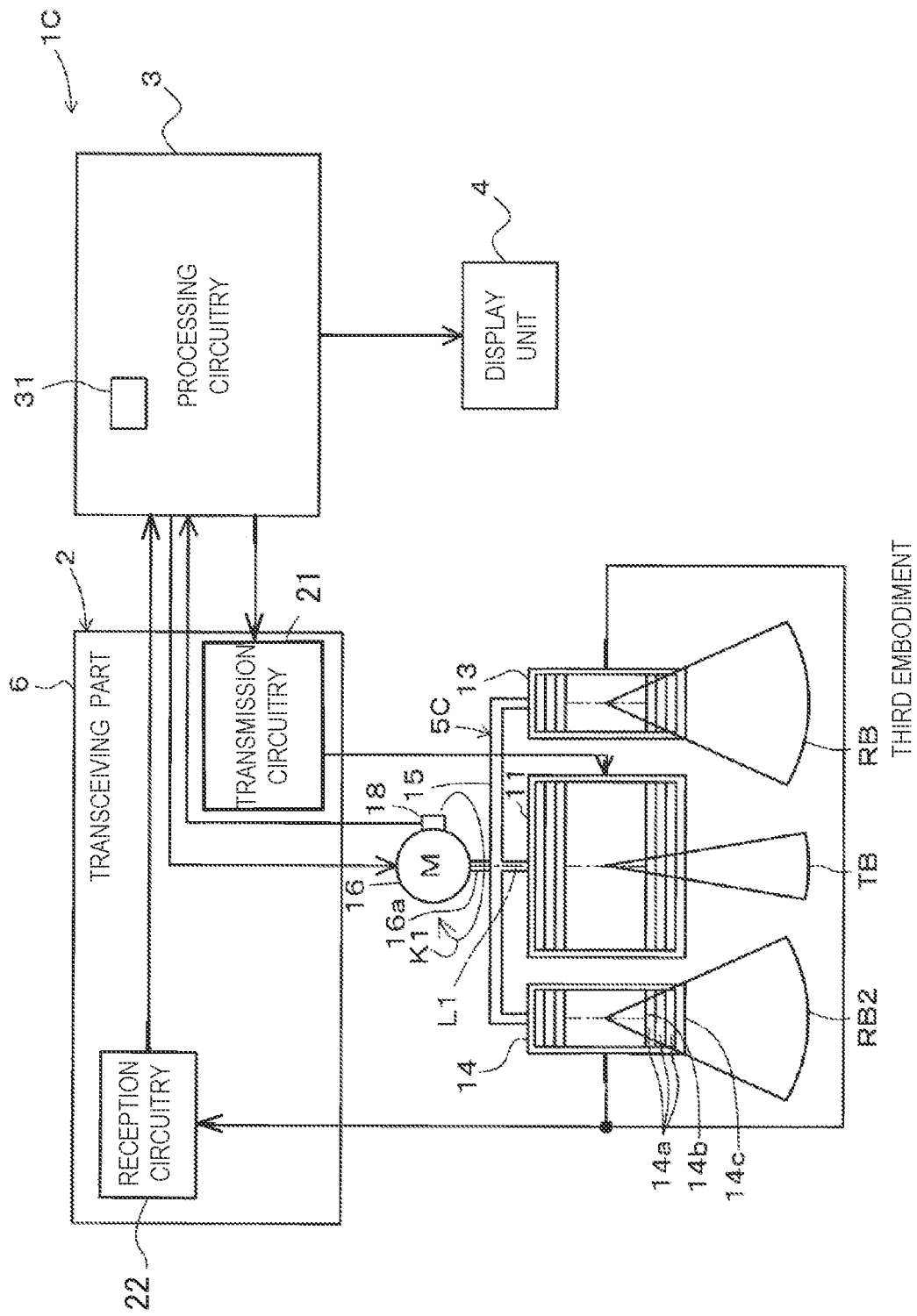
FIG. 14 is a block diagram illustrating a configuration of an underwater detection apparatus according to a third embodiment of the present disclosure.
Figure 15:
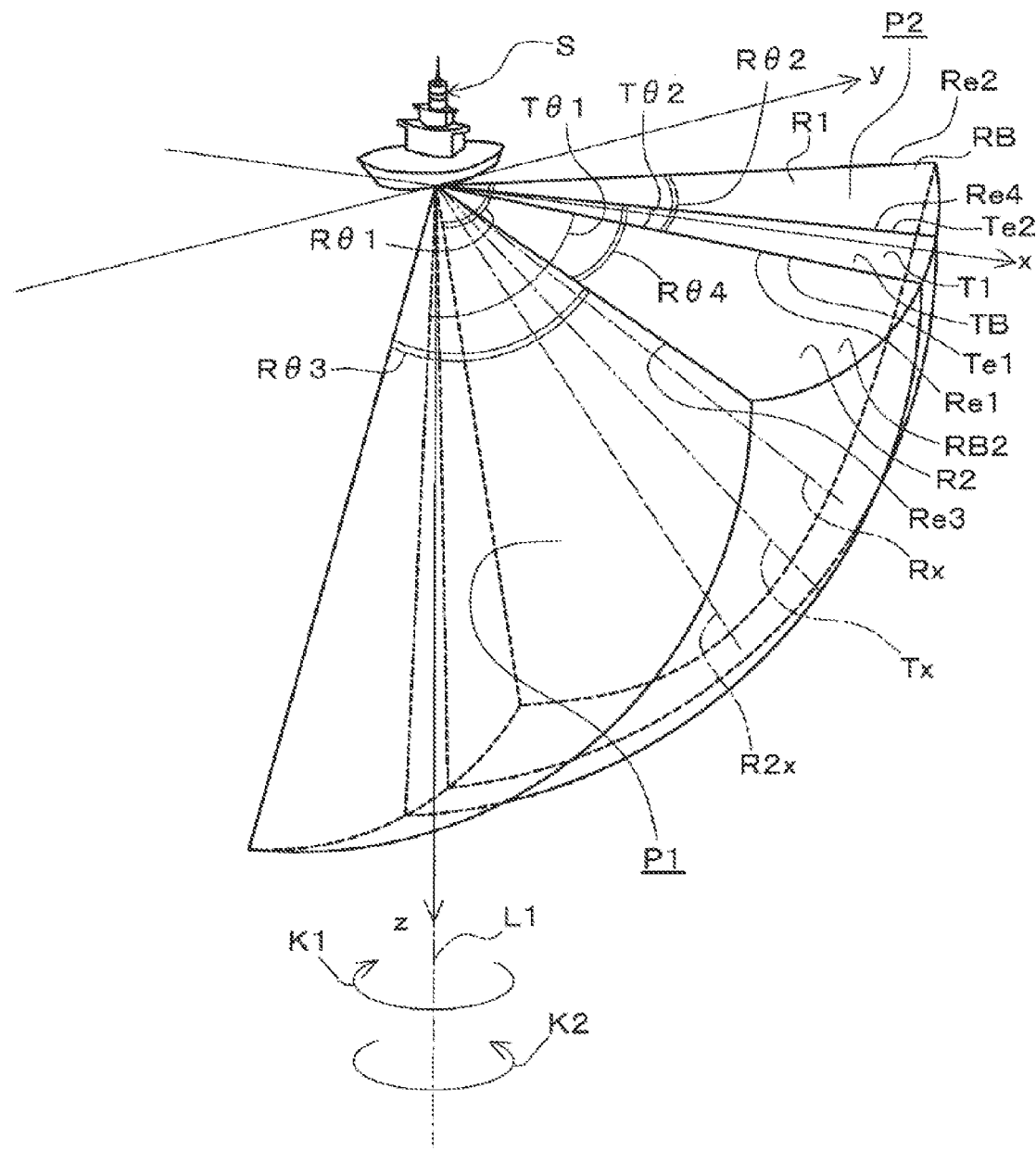
FIG. 15 is a view schematically illustrating a transmission beam formed by the wave transmitter and a reception beam received by the wave receiver.
Figure 16:
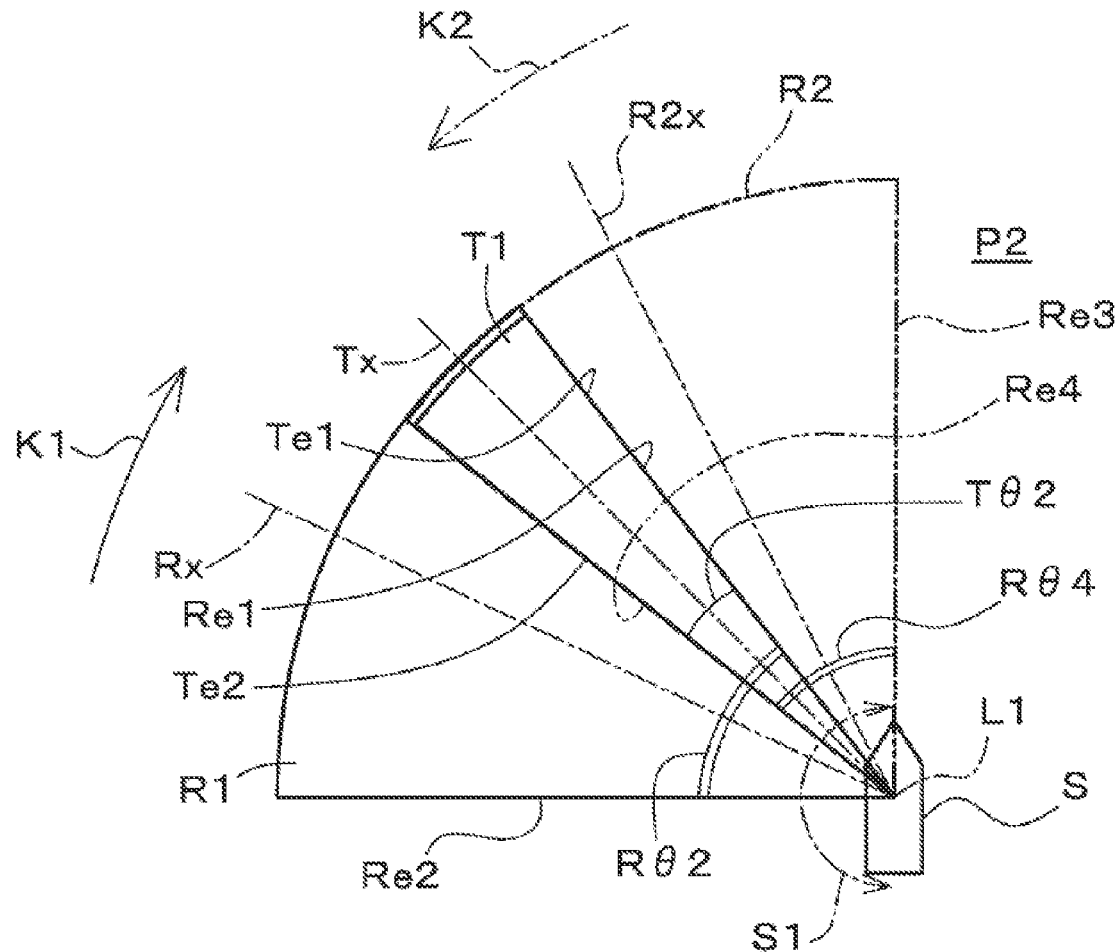
FIG. 16 is a plan view of the ship to which the underwater detection apparatus is mounted, seen in a direction perpendicular to the second plane, where a transmission fan-shaped space formed by the wave transmitter and a reception fan-shaped space received by the wave receiver are schematically illustrated.

FIG. 14 is a block diagram illustrating a configuration of an underwater detection apparatus 1C according to a third embodiment of the present disclosure. FIG. 15 is a view schematically illustrating the transmission beam TB formed by the wave transmitter 11, the reception beam RB received by the wave receiver 13, and a reception beam RB2 received by a second wave receiver 14. FIG. 16 is a plan view of a ship S to which the underwater detection apparatus 1C is mounted, seen in the direction perpendicular to the second plane P2, and where the transmission fan-shaped space T1 formed by the wave transmitter 11, the reception fan-shaped space R1 received by the wave receiver 13, and a reception fan-shaped space R2 received by the second wave receiver 14 are schematically illustrated.

Referring to FIGS. 14 to 16, a difference of the underwater detection apparatus 1C from the underwater detection apparatus 1 of the first embodiment may be that the second wave receiver 14 (hereinafter, may simply be referred to as "the wave receiver 14") constituted as a second reception transducer is provided, in addition to the wave receiver 13 constituted as the reception transducer. That is, the two wave receivers 13 and 14 may be provided to the underwater detection apparatus 1C. In the underwater detection apparatus 1C, when the wave transmitter 11 and the wave receivers 13 and 14 rotate in the first direction K1 which is a given direction about the rotation axis L1, the wave receiver 13 may receive the reception wave of the reception fan-shaped space R1, and when the wave transmitter 11 and the wave receivers 13 and 14 rotate in the second direction K2 about the rotation axis L1, the second wave receiver 14 may receive the reception wave of the reception fan-shaped space R2.

A wave transceiving unit 5C may include the wave transmitter 11, the wave receiver 13, the second wave receiver 14, the bracket 15 which supports the wave transmitter 11 and the wave receivers 13 and 14, the motor 16 as the rotary driving part, and the rotational angle detecting part 18.

The second wave receiver 14 may be disposed so that wave transmitter 11 is disposed between the wave receiver 13 and the second wave receiver 14. The second wave receiver 14 may have a configuration in which one or more wave receiving elements 14a as the ultrasonic transducers are attached to a casing 14c. Each wave receiving element 14a may have a wave receiving surface 14b. The second wave receiver 14 may be attached to the bracket 15. The wave transmitter 11 and the wave receivers 13 and 14 may be integrally rotated by the motor 16 about the rotation axis L1 of the motor 16.

The second wave receiver 14 may receive a signal of the second reception fan-shaped space R2 which is a range or space where the three-dimensional reception beam RB2 is formed. The second reception fan-shaped space R2 may be a substantially fan-shaped beam. That is, the second wave receiver 14 may receive the reflection wave of the transmission wave in the second reception fan-shaped space R2 as the reception wave. The second reception fan-shaped space R2 may differ in the position about the rotation axis L1 from the reception fan-shaped space R1, however, it may have the same fan shape as the reception fan-shaped space R1.

The second wave receiver 14 may perform the beam forming with the transceiving part 6 and the signal processor 3 which will be described in detail below, similar to the wave receiver 13, to detect inside the reception fan-shaped space R2 as the fan-shaped space where the linear array of the second wave receiver 14 has the gain by using the thin reception beam which scans electronically.

The second reception fan-shaped space R2 may have a third receiving width Rθ3 in the first plane P1, and it may have a fourth receiving width Rθ4 in the second plane P2, where the third receiving width Rθ3 is wider than the fourth receiving width Rθ4. Further, the fourth receiving width Rθ4 of the second reception fan-shaped space R2 may be wider than the second transmitting width Tθ2 of the transmission fan-shaped space T1 (i.e., Rθ4>Tθ2). The second reception fan-shaped space R2 may be formed in the fan shape both in the first plane P1 and the second plane P2. The third receiving width Rθ3 may be an angle width about the horizontal axis centering on the second wave receiver 14. The fourth receiving width Rθ4 may be an angle width about the rotation axis L1 of the motor 16.

Note that, as described above, when the reception power sensitivity at edges Re3 and Re4 of the second reception fan-shaped space R2 is the magnitude of −3 dB from the reception power sensitivity at a center axis R2x, the fourth receiving width Rθ4<the third receiving width Rθ3. On the other hand, for example, when the reception power sensitivity at the edges Re3 and Re4 of the reception fan-shaped space R2 is the magnitude of −10 dB (i.e., smaller than −3 dB) from the reception power sensitivity at the center axis R2x, the fourth receiving width Rθ4 may be larger than the third receiving width Rθ3.

The third receiving width Rθ3 may be within a range of 6° to 90°. Although the fourth receiving width Rθ4 is, for example, 36°, it may be an angle less than 90° as long as it is larger than the second transmitting width Tθ2, without being limited to this configuration. Note that, in this embodiment, the fourth receiving width Rθ4 and the second receiving width Rθ2 may be set as the same value.

An angle formed by the direction which is perpendicular to the wave receiving surface 14b of the linear array and where the second reception fan-shaped space R2 is formed, and the horizontal plane, may be any angle, as long as it is within a range from 0° which is an angle in case where the linear array is disposed in the vertical direction to 90° which is an angle in case where the linear array is disposed in the horizontal direction.

About the rotation axis L1 in the second plane P2, the center axis R2x of the second reception fan-shaped space R2 may be a line on which the reception power sensitivity is the highest in the second reception fan-shaped space R2. On the other hand, about the rotation axis L1 in the second plane P2, the third reception edge Re3 and the fourth reception edge Re4 as a pair of edges of the second reception fan-shaped space R2 may be lines at positions where the reception power sensitivity is the lowest in the second reception fan-shaped space R2. In this embodiment, the reception power sensitivity at the reception edges Re3 and Re4 may be an intensity of −3 dB from the reception power sensitivity at the center axis R2x, and may be a substantially half of the intensity. The second reception fan-shaped space R2 may be a range or space which includes the center axis R2x at which the reception power sensitivity of the second reception fan-shaped space R2 is the maximum, and where the reception power sensitivity is halved from the maximum to −3 dB. In this embodiment, the second wave receiver 14 may be provided to the bottom of the ship so that the center axis R2x of the second reception fan-shaped space R2 becomes obliquely to the vertical direction. Note that the second reception fan-shaped space R2 may be a range where the reception power sensitivity is reduced by −n3 dB (n3 is set according to the detection target object etc. of the underwater detection apparatus 1C) from the maximum value. The third reception edge Re3 may be a leading edge or front edge in the first direction K1, and the fourth reception edge Re4 may be a trailing edge in the first direction K1.

In this embodiment, in the second plane P2, the transmission fan-shaped space T1 may be located in the reception fan-shaped space R1 and may be also located in the second reception fan-shaped space R2. That is, the transmission fan-shaped space T1 may be located so as to be included in the reception fan-shaped space R1 and also included in the second reception fan-shaped space R2. In detail, in the second plane P2, both the pair of the transmission edges Te1 and Te2 of the transmission fan-shaped space T1 may be located in the reception fan-shaped space R1, and may be also located in the second reception fan-shaped space R2.

Moreover, in this embodiment, the wave transmitter 11, the wave receiver 13, and the second wave receiver 14 may be configured so that the transmission fan-shaped space T1 is located in a forward part or front part of the reception fan-shaped space R1 in the rotating direction of the motor 16 (the first direction K1), and is located in a rearward part of the second reception fan-shaped space R2 in the rotating direction of the motor 16 (the first direction K1), when the motor 16 rotates in the first direction K1 (the given direction). That is, in the second plane P2, the wave transmitter 11, the wave receiver 13, and the second wave receiver 14 may be configured so that the transmission fan-shaped space T1 is located in the forward half or front half side of the reception fan-shaped space R1 and is located in the rearward half or back half side of the second reception fan-shaped space R2 in the rotating direction of the motor 16 (the first direction K1), when the motor 16 rotates in the first direction K1 (the given direction). In addition, the wave transmitter 11, the wave receiver 13, and the second wave receiver 14 may be configured so that the transmission fan-shaped space T1 is located in a forward part or front part of the second reception fan-shaped space R2 in the rotating direction of the motor 16 (the second direction K2), and is located in a rearward part of the reception fan-shaped space R1 in the rotating direction of the motor 16 (the second direction K2), when the motor 16 rotates in the second direction K2 opposite from the first direction. That is, in the second plane P2, the wave transmitter 11, the wave receiver 13, and the second wave receiver 14 may be configured so that the transmission fan-shaped space T1 is located in the forward half or front half side of the second reception fan-shaped space R2 and is located in the rearward half or back half side of the reception fan-shaped space R1 in the rotating direction of the motor 16 (the second direction K2), when the motor 16 rotates in the second direction K2.

In this embodiment, in the second plane P2, the first transmission edge Te1 and the first reception edge Re1 which are the leading edges of the transmission fan-shaped space T1 and the reception fan-shaped space R1 in the first direction K1, respectively, may be overlapped with each other, and the second transmission edge Te2 and the fourth reception edge Re4 which are the trailing edges of the transmission fan-shaped space T1 and the second reception fan-shaped space R2 in the first direction K1, respectively, may be overlapped with each other. In addition, in the second plane P2, the second transmission edge Te2 and the fourth reception edge Re4 which are the leading edges of the transmission fan-shaped space T1 and the second reception fan-shaped space R2 in the second direction K2, respectively, may be overlapped with each other, and the first transmission edge Te1 and the first reception edge Re1 which are the trailing edges of the transmission fan-shaped space T1 and the reception fan-shaped space R1 in the second direction K2, respectively, may be overlapped with each other. That is, when the motor 16 rotates in the first direction K1, the leading transmission edge Te1 of the pair of the transmission edges Te1 and Te2 of the transmission fan-shaped space T1 in the rotating direction of the motor 16 (the first direction K1) may be located at the leading reception edge Re1 of the reception fan-shaped space R1 in the rotating direction of the motor 16 (the first direction K1). Further, when the motor 16 rotates in the second direction K2, the leading transmission edge Te2 of the pair of the transmission edges Te1 and Te2 of the transmission fan-shaped space T1 in the rotating direction of the motor 16 (the second direction K2) may be located at the leading reception edge Re4 of the second reception fan-shaped space R2 in the rotating direction of the motor 16 (the second direction K2). Therefore, in this embodiment, the wave transmitter 11, the wave receiver 13, and the second wave receiver 14 may be configured so that the transmission fan-shaped space T1 is located in the forward part or front edge part of the reception fan-shaped space R1 in the rotating direction of the motor 16 (the first direction K1), when the motor 16 rotates in the first direction K1, and is located in the forward part or front end part of the second reception fan-shaped space R2 in the rotating direction of the motor 16 (the second direction K2), when the motor 16 rotates in the second direction K2.

Referring again to FIGS. 14 to 16, the motor 16 may rotate the wave transmitter 11, the wave receiver 13, and the second wave receiver 14 integrally in the first direction K1 or the second direction K2 about the rotation axis L1. That is, the motor 16 may rotate the transmission fan-shaped space T1, the reception fan-shaped space R1, and the second reception fan-shaped space R2.

The receiving part 22 of the transceiving part 6 may be connected with the wave receiver 13 and the second wave receiver 14, may amplify the echo signal as the electric signal outputted selectively from one of the wave receivers 13 and 14, and may carry out the A/D conversion of the amplified echo signal. Then, the receiving part 22 may output the echo signal converted into the digital signal to the signal processor 3. In detail, the receiving part 22 may have a plurality of reception circuitries. Each reception circuitry may output to the signal processor 3 each echo signal (reception signal) acquired by converting the reception wave received by the wave receiving element 13a or 14a into the electric signal.

The controller 31 of the signal processor 3 may selectively receive from the transceiving part 6 the echo signal from the wave receiver 13 or the echo signal from the second wave receiver 14. Then, the signal processor 3 may generate the image data as the detection information based on the echo signal (i.e., the reception signal) from the wave receiver 13 or the echo signal (i.e., the second reception signal) from the second wave receiver 14.

With the above configuration, in this embodiment, the receiving part 22 may constitute the reception circuitry which generates the reception signal as the echo signal from the reception wave received by the wave receiver 13, and generate the second reception signal as the echo signal from the reception wave received by the second wave receiver 14. The signal processor 3 including the hardware processor 39 may constitute the processing circuitry which generates the detection information as the image data based on the reception signal and the second reception signal.

Moreover, in this embodiment, when the signal processor 3 rotates the wave transmitter 11 and the wave receivers 13 and 14 in the first direction K1 in the detection area S1, it may transmit the transmission pulse wave from the wave transmitter 11 to the transmission fan-shaped space T1, and perform the beam forming, for the reception wave received by the wave receiver 13, by using the reception result in the reception fan-shaped space R1 to generate the image data indicative of the detection result. That is, in this embodiment, when the motor 16 rotates in the given first direction K1, the signal processor 3 as the processing circuitry may generate the detection information as the image data based on the reception signal as the echo signal generated from the reception wave received by the wave receiver 13. Note that, at this time, the signal of the second reception fan-shaped space R2 may not be used for the image data generation.

On the other hand, when the signal processor 3 rotates the wave transmitter 11 and the wave receivers 13 and 14 in the second direction K2 in the detection area S1, it may transmit the transmission pulse wave from the wave transmitter 11 to the transmission fan-shaped space T1, and perform the beam forming, for the reception wave received by the second wave receiver 14, by using the reception result in the second reception fan-shaped space R2 to generate the image data indicative of the detection result. That is, in this embodiment, when the motor 16 rotates in the second direction K2 different from the first direction K1, the signal processor 3 as the processing circuitry may generate the detection information as the image data based on the second reception signal as the echo signal generated from the reception wave received by the second wave receiver 14. Note that, at this time, the signal of the reception fan-shaped space R1 may not be used for the image data generation.

According to the configuration of the wave transceiving unit 5C, the underwater detection apparatus 1C can detect the target object in the three-dimensional space covering the large area centering on the ship S, and estimate the three-dimensional position of the target object in this space.

As described above, according to the underwater detection apparatus 1C of the third embodiment, the underwater detection can be performed even when the wave transmitter 11 and the wave receivers 13 and 14 rotate either in the first direction K1 or the second direction K2. As a result, the motor 16 can also rotate so as to oscillate within an angle range of 360°. Therefore, the slip ring may become unnecessary. Further, the operation for physically reversing the wave transmitter 11 and the wave receivers 13 and 14 may be unnecessary.

Modification of Third Embodiment

Figure 17:
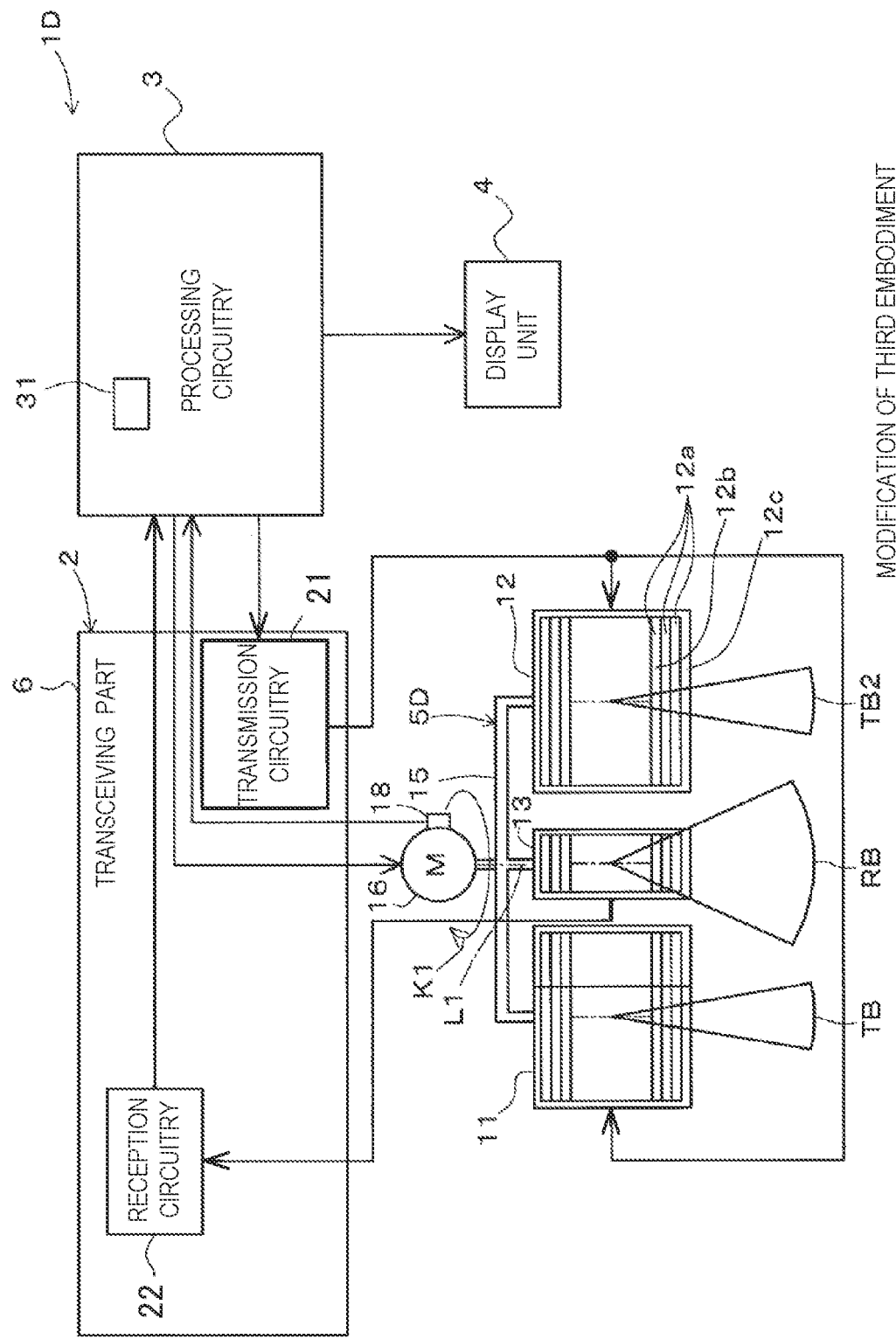
FIG. 17 is a block diagram illustrating a configuration of an underwater detection apparatus according to a modification of the third embodiment of the present disclosure.
Figure 18:
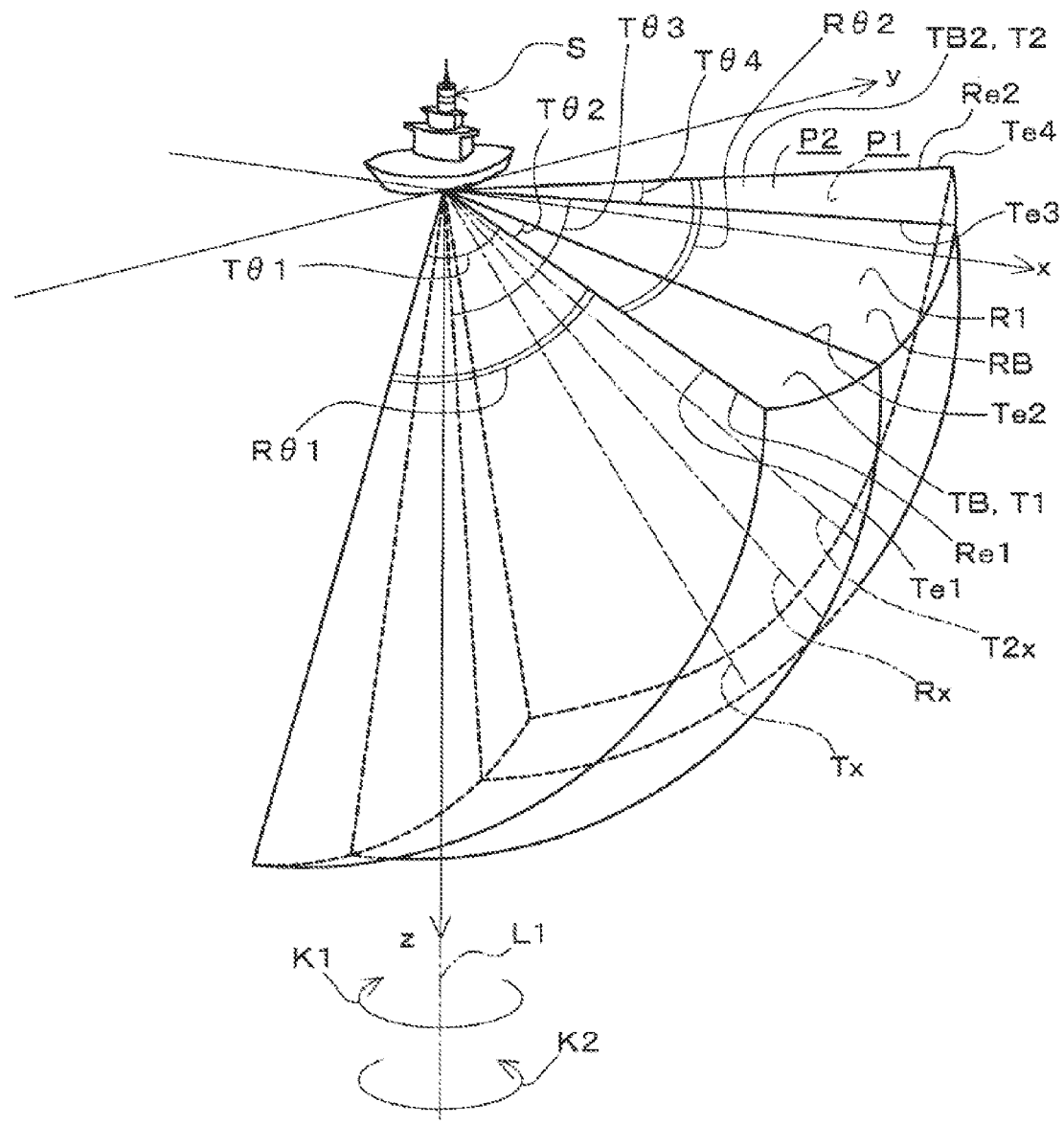
FIG. 18 is a view schematically illustrating a transmission beam formed by the wave transmitter and a second wave transmitter, and a reception beam received by the wave receiver.
Figure 19:
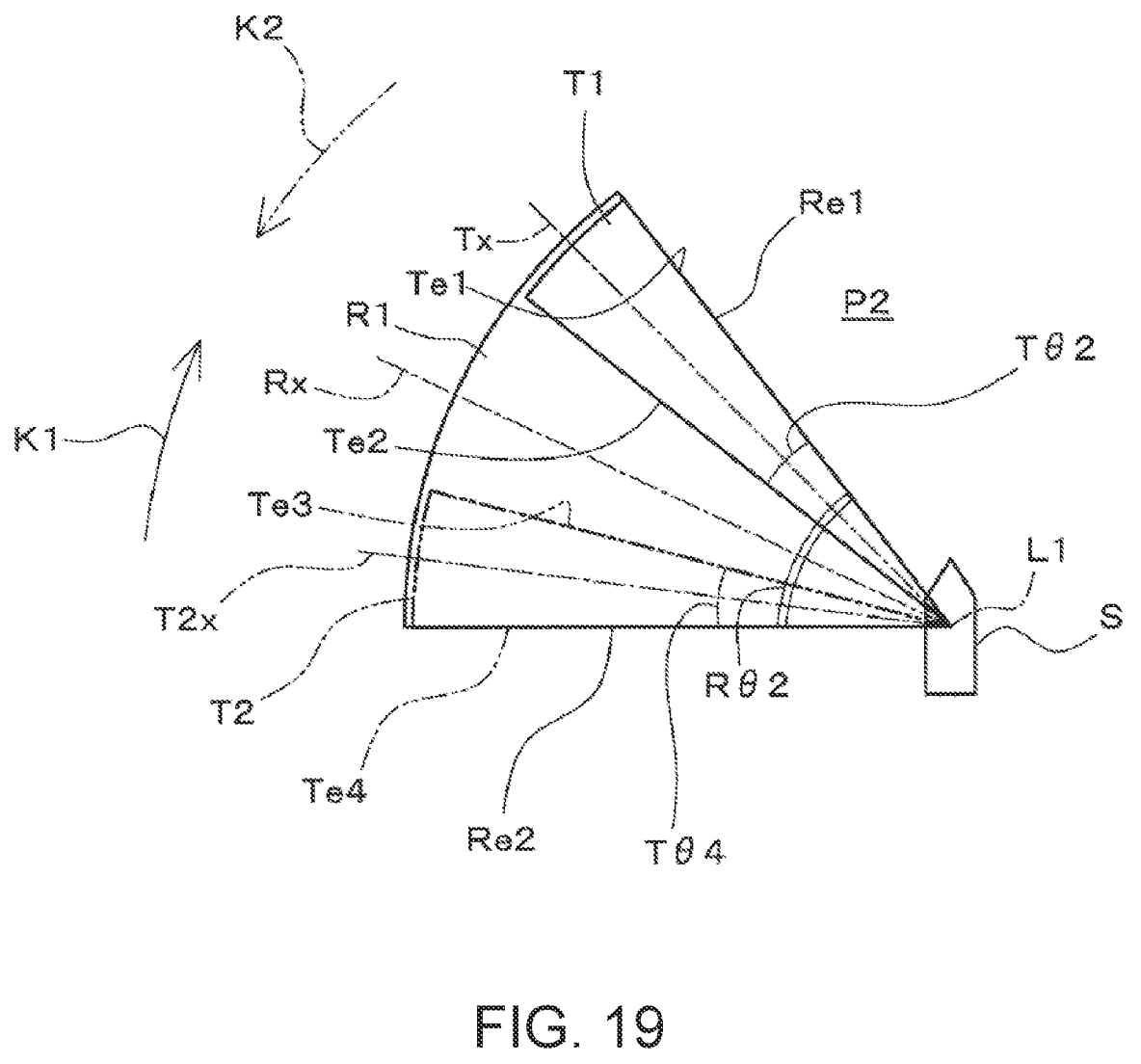

FIG. 17 is a block diagram illustrating a configuration of an underwater detection apparatus 1D according to a modification of the third embodiment of the present disclosure. FIG. 18 is a view schematically illustrating the transmission beam TB formed by the wave transmitter 11, a transmission beam TB2 formed by a second wave transmitter 12, and the reception beam RB received by the wave receiver 13. FIG. 19 is a plan view of the ship S to which the underwater detection apparatus 1D is mounted, seen in the direction perpendicular to the second plane P2, where the transmission fan-shaped space T1 formed by the wave transmitter 11, a second transmission fan-shaped space T2 formed by the second wave transmitter 12, and the reception fan-shaped space R1 received by the wave receiver 13 are schematically illustrated.

Referring to FIGS. 17 to 19, a difference of the underwater detection apparatus 1D from the underwater detection apparatus 1C of the third embodiment is that the second wave transmitter 12 (hereinafter, may simply be referred to as "the wave transmitter 12") constituted as a second transmission transducer is provided in addition to the wave transmitter 11 constituted as the transmission transducer, and only one wave receiver 13 is provided. That is, the underwater detection apparatus 1D may be provided with the two wave transmitters 11 and 12, and may also be provided with the single wave receiver 13. In the underwater detection apparatus 1D, when the wave transmitters 11 and 12 and the wave receiver 13 rotate about the rotation axis L1 in the first direction K1 which is the given direction, the wave transmitter 11 may transmit the transmission pulse wave to the transmission fan-shaped space T1. Moreover, when the wave transmitters 11 and 12 and the wave receiver 13 rotate in the second direction K2 about the rotation axis L1, the second wave transmitter 12 may transmit the transmission pulse wave to the second transmission fan-shaped space T2.

A wave transceiving unit 5D may include the wave transmitter 11, the second wave transmitter 12, the wave receiver 13, the bracket 15 which supports the wave transmitters 11 and 12 and the wave receiver 13, the motor 16 as the rotary driving part, and the rotational angle detecting part 18.

The second wave transmitter 12 may be disposed so that the wave receiver 13 is disposed between the wave transmitter 11 and the second wave transmitter 12. The second wave transmitter 12 may have the configuration in which one or more wave transmission elements 12a as the ultrasonic transducers are attached to a casing 12c. Each wave transmission element 12a may have a second wave transmitting surface 12b. The second wave transmitter 12 may be attached to the bracket 15, and the wave transmitters 11 and 12 and the wave receiver 13 may be rotated integrally by the motor 16 about the rotation axis L1 of the motor 16.

The second wave transmitter 12 may form the three-dimensional transmission beam TB2 in the second transmission fan-shaped space T2. The second transmission fan-shaped space T2 may be the substantially fan-shaped beam, and may have the same shape as the transmission fan-shaped space T1. That is, the second wave transmitter 12 may transmit the second transmission wave into the second transmission fan-shaped space T2. The second transmission fan-shaped space T2 may be the range which includes the center axis T2$x$ at which the transmission signal power of the second transmission fan-shaped space T2 is the maximum, and where the transmission signal power is halved from the maximum to −3 dB. In this modification, the second wave transmitter 12 may be provided to the bottom of the ship so that the center axis T2$x$ of the second transmission fan-shaped space T2 becomes obliquely to the vertical direction (the z-axis direction in FIG. 18). Note that the second transmission fan-shaped space T2 may be the range where the transmission signal power is reduced by −n4 dB (n4 is set according to the detection target object etc. of the underwater detection apparatus 1D) from the maximum.

The second transmission fan-shaped space T2 may have a third transmitting width T$\theta$3 in the first plane P1 and have a fourth transmitting width T$\theta$4 in the second plane P2, where the third transmitting width T$\theta$3 is wider than the fourth transmitting width T$\theta$4. The second transmission fan-shaped space T2 may be formed in the fan shape both in the first plane P1 and the second plane P2. The third transmitting width T$\theta$3 may be the angle width about the horizontal axis centering on the second wave transmitter 12. The fourth transmitting width T$\theta$4 may be the angle width about the rotation axis L1 of the motor 16. Moreover, in this modification, the third transmitting width T$\theta$3 may be set same as the first transmitting width T$\theta$1. In addition, the fourth transmitting width T$\theta$4 may be set same as the second transmitting width T$\theta$2. In this modification, the second receiving width R$\theta$2 of the reception fan-shaped space R1 may be set wider than the fourth transmitting width T$\theta$4 of the second transmission fan-shaped space T2 (i.e., R$\theta$2>T$\theta$4). Further, in the second plane P2, the second transmission fan-shaped space T2 may be located inside the reception fan-shaped space R1.

Note that, as described above, when the transmission signal power at the edges Te1 and Te2 of the transmission fan-shaped space T1 is the magnitude of −3 dB from the transmission signal power at the center axis Tx, the second transmitting width T$\theta$2<the first transmitting width T$\theta$1. On the other hand, for example, when the transmission signal power at the edges Te1 and Te2 of the transmission fan-shaped space T1 is the magnitude of −10 dB (i.e., smaller than −3 dB) from the transmission signal power at the center axis Tx, the second transmitting width T$\theta$2 may be larger than the first transmitting width T$\theta$1.

Moreover, as described above, when the transmission signal power at the edges Te3 and Te4 of the second transmission fan-shaped space T2 is the magnitude of −3 dB from the transmission signal power at the center axis T2$x$, the fourth transmitting width T$\theta$4<the third transmitting width Tθ3. On the other hand, for example, when the transmission signal power at the edges Te3 and Te4 of the second transmission fan-shaped space T2 is the magnitude of −10 dB (i.e., smaller than −3 dB) from the transmission signal power at the center axis T2x, the fourth transmitting width Tθ4 may be larger than the third transmitting width Tθ3.

The angle formed by the direction which is perpendicular to the wave transmitting surface 12b of the linear array and in which the second transmission fan-shaped space T2 is formed, and the horizontal plane, may be any angle, as long as it is within the range from 0° which is the angle in case where the linear array is disposed in the vertical direction to 90° which is the angle in case where the linear array is disposed in the horizontal direction.

About the rotation axis L1 in the second plane P2, the center axis T2x of the second transmission fan-shaped space T2 may be a line at which the transmission signal power is the highest in the second transmission fan-shaped space T2. On the other hand, about the rotation axis L1 in the second plane P2, the third transmission edge Te3 and the fourth transmission edge Te4 as the pair of edges of the second transmission fan-shaped space T2 may be the lines at which the transmission signal power is the lowest in the second transmission fan-shaped space T2. The transmission signal power in the transmission edges Te3 and Te4 may be a half of the transmission signal power at the center axis T2x. The third transmission edge Te3 may be the trailing edge of the second direction K2, and the fourth transmission edge Te4 may be the leading edge of the second direction K2.

In this modification, in the second plane P2, the transmission fan-shaped space T1 may be located in the reception fan-shaped space R1, and further, the second transmission fan-shaped space T2 may also be located in the reception fan-shaped space R1. That is, the transmission fan-shaped space T1 may be included in the reception fan-shaped space R1, the second transmission fan-shaped space T2 may also be included in the reception fan-shaped space R1. In more detail, in the second plane P2, both the pair of the transmission edges Te1 and Te2 of the transmission fan-shaped space T1 may be located in the reception fan-shaped space R1, both the pair of the transmission edges Te3 and Te4 of the second transmission fan-shaped space T2 may be located in the reception fan-shaped space R1.

Moreover, in this modification, the wave transmitter 11, the second wave transmitter 12, and the wave receiver 13 may be configured so that, when the motor 16 rotates in the first direction K1 (the given direction), the transmission fan-shaped space T1 is located in the forward part or front part of the reception fan-shaped space R1 in the rotating direction of the motor 16 (the first direction K1), and the second transmission fan-shaped space T2 is located in the rearward part of the reception fan-shaped space R1 in the rotating direction of the motor 16 (the first direction K1). That is, the wave transmitter 11, the second wave transmitter 12, and the wave receiver 13 may be configured so that, in the second plane P2, when the motor 16 rotates in the first direction K1 (the given direction), the transmission fan-shaped space T1 is located in the forward half or front half side of the reception fan-shaped space R1, and the second transmission fan-shaped space T2 is located in the rearward half or back half side of the reception fan-shaped space R1 in the rotating direction of the motor 16 (the first direction K1). Further, the wave transmitter 11, the second wave transmitter 12, and the wave receiver 13 may be configured so that, when the motor 16 rotates in the second direction K2 opposite from the first direction K1, the second transmission fan-shaped space T2 is located in the forward part or front part of the reception fan-shaped space R1 in the rotating direction of the motor 16 (the second direction K2), and the transmission fan-shaped space T1 is located in the rearward part of the reception fan-shaped space R1 in the rotating direction of the motor 16 (the second direction K2). That is, the wave transmitter 11, the second wave transmitter 12, and the wave receiver 13 may be configured so that, in the second plane P2, when the motor 16 rotates in the second direction K2, the second transmission fan-shaped space T2 is located in the forward half or front half side of the reception fan-shaped space R1, and the transmission fan-shaped space T1 is located in the rearward half or back half side of the reception fan-shaped space R1 in the rotating direction of the motor 16 (the second direction K2).

Moreover, in this modification, in the second plane P2, the first transmission edge Te1 and the first reception edge Re1 which are the leading edges of the transmission fan-shaped space T1 and the reception fan-shaped space R1 in the first direction K1, respectively, may be overlapped with each other, and the fourth transmission edge Te4 and the second reception edge Re2 which are the trailing edges of the second transmission fan-shaped space T2 and the reception fan-shaped space R1 in the first direction K1, respectively, may be overlapped with each other. Further, in the second plane P2, the fourth transmission edge Te4 and the second reception edge Re2 which are the leading edges of the second transmission fan-shaped space T2 and the reception fan-shaped space R1 in the second direction K2, respectively, may be overlapped with each other, and the first transmission edge Te1 and the first reception edge Re1 which are the trailing edges of the transmission fan-shaped space T1 and the reception fan-shaped space R1 in the second direction K2, respectively, may be overlapped with each other. That is, when the motor 16 rotates in the first direction K1, the leading transmission edge Te1 of the pair of the transmission edges Te1 and Te2 of the transmission fan-shaped space T1 in the rotating direction of the motor 16 (the first direction K1) may be located at the leading reception edge Re1 of the reception fan-shaped space R1 in the rotating direction of the motor 16. When the motor 16 rotates in the second direction K2, the leading transmission edge Te4 of the pair of the transmission edges Te3 and Te4 of the second transmission fan-shaped space T2 in the rotating direction of the motor 16 (the second direction K2) may be located at the leading reception edge Re2 of the reception fan-shaped space R1 in the rotating direction of the motor 16. Therefore, in this modification, the wave transmitter 11, the second wave transmitter 12, and the wave receiver 13 may be configured so that, when the motor 16 rotates in the first direction K1, the transmission fan-shaped space T1 is located in the forward part or front part of the reception fan-shaped space R1 in the rotating direction of the motor 16 (the first direction K1), and when the motor 16 rotates in the second direction K2, the second transmission fan-shaped space T2 is located in the forward part or front end part of the reception fan-shaped space R1 in the rotating direction of the motor 16 (the second direction K2).

Referring again to FIGS. 17 to 19, the motor 16 may integrally rotate the wave transmitters 11 and 12 and the wave receiver 13 in the first direction K1 or the second direction K2 about the rotation axis L1. That is, the motor 16 may rotate the transmission fan-shaped space T1, the second transmission fan-shaped space T2, and the reception fan-shaped space R1.

The signal processor 3 may generate the transmission pulse signal so as to transmit the transmission pulse wave through the transmitting part 21 and drive the wave transmitter 11 and the second wave transmitter 12. In more detail, when the signal processor 3 generates the transmission pulse signal, the transmitting part 21 may amplify the transmission pulse signal generated by the signal processor 3, and apply the amplified signal selectively to the wave transmitter 11 or the second wave transmitter 12 as the amplified transmission pulse signal. Therefore, from the wave transmitter 11 or the second wave transmitter 12, the transmission pulse wave corresponding to the amplified transmission pulse signal may be transmitted.

With the above configuration, in this modification, the signal processor 3 including the hardware processor 39 may constitute the processing circuitry which drives the wave transmitter 11 and the second wave transmitter 12. Moreover, in this modification, the signal processor 3 as the processing circuitry may drive the wave transmitter 11 when the motor 16 rotates in the first direction K1, and drive the second wave transmitter 12 when the motor 16 rotates in the second direction K2 different from the first direction K1.

In more detail, when rotating the motor 16 in the first direction K1 and rotating the wave transmitters 11 and 12 and the wave receiver 13 in the first direction K1 in the detection area S1, the signal processor 3 may drive the wave transmitter 11 so that a transmission pulse wave is transmitted from the wave transmitter 11 to the transmission fan-shaped space T1. Further, the signal processor 3 may transmit the transmission pulse signal from the wave transmitter 11, and perform the beam forming, for the reception wave received by the wave receiver 13, by using the reception result of the reception fan-shaped space R1 to generate the image data indicative of the detection result. At this time, the transmission pulse wave may not be transmitted from the second wave transmitter 12.

On the other hand, when the signal processor 3 rotates the motor 16 in the second direction K2 and rotates the wave transmitters 11 and 12 and the wave receiver 13 in the second direction K2 in the detection area S1, it may drive the second wave transmitter 12 so that the transmission pulse wave is transmitted to the second transmission fan-shaped space T2 from the second wave transmitter 12. Further, the signal processor 3 may transmit the transmission pulse signal from the second wave transmitter 12, and perform the beam forming, for the reception wave received by the wave receiver 13, by using the reception result of the reception fan-shaped space R1 to generate the image data indicative of the detection result. At this time, the transmission pulse wave may not be transmitted from the wave transmitter 11.

According to the configuration of the wave transceiving unit 5D, the underwater detection apparatus 1D can detect the target object in the three-dimensional space covering the large area centering on the ship S, and estimate the three-dimensional position of the target object in this space.

As described above, according to the underwater detection apparatus 1D of this modification of the third embodiment, the underwater detection can be performed even when the wave transmitters 11 and 12 and the wave receiver 13 rotate either in the first direction K1 or the second direction K2. As a result, the motor 16 can also rotate so as to oscillate within the angle range of 360°. Therefore, the slip ring may become unnecessary. Further, the operation for physically reversing the wave transmitters 11 and 12 and the wave receiver 13 may be unnecessary.

Other Modifications

The embodiments and the modifications of the present disclosure are described above. However, the present disclosure is not limited to the above configuration, and may variously be changed or modified without departing from the scope of the present disclosure.

(1) In the embodiments and the modifications, the wave transmitters 11 and 12 may have the plurality of wave transmission elements 11a and 12a, respectively. However, this configuration may be altered. For example, each of the wave transmitters 11 and 12 may have a single wave transmission element. Moreover, the wave receivers 13 and 14 may have the plurality of wave receiving elements 13a and 14a, respectively. However, this configuration may be altered. For example, each wave receiver has a single wave receiving element. When each of the wave receivers 13 and 14 has one wave receiving element, a two-dimensional detection result image can be displayed on the display unit.

(2) Moreover, in the above embodiments and the above modifications, the wave transmitters 11 and 12 dedicated for transmission and the wave receivers 13 and 14 dedicated for reception may be provided. However, this configuration may be altered.

Figure 20:
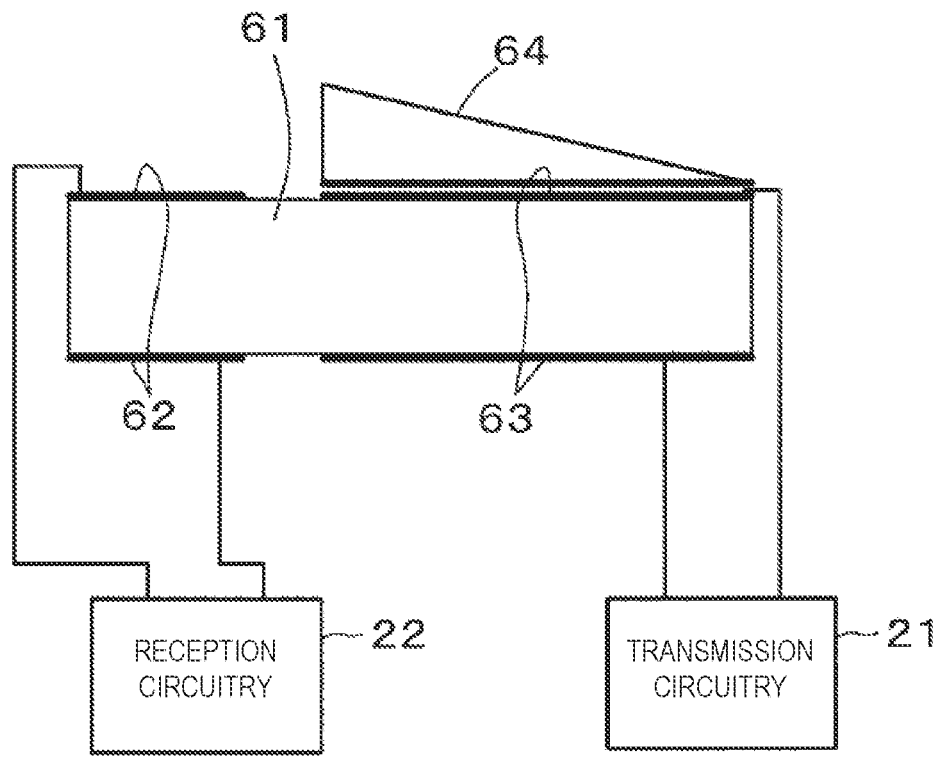
FIG. 20 is a view schematically illustrating a substantial part of a further modification of a substantial part of a transducer.

For example, a transducer having the substantial part illustrated in FIG. 20 as the modification may be used to perform the transmission of the transmission pulse wave and the reception of the reflection wave. This transducer may have one piezo-electric element 61, a pair of the reception electrodes 62 provided to the front surface and the back surface of the piezo-electric element 61, a pair of the transmission electrodes 63 provided to the front surface and the back surface of the piezo-electric element 61, and an acoustic lens 64 provided to one of the transmission electrodes 63. The pair of the reception electrodes 62 may be connected to the receiving part 22. Moreover, the pair of the transmission electrodes 63 may be connected to the transmitting part 21.

(3) Moreover, in the above embodiments and the above modifications, although the underwater detection apparatus detects the perimeter below the ship S, this configuration may be altered. The present disclosure is also applicable to other underwater detection apparatuses, such as a front detection sonar, a starboard detection sonar, and a port detection sonar.

Figure 21:
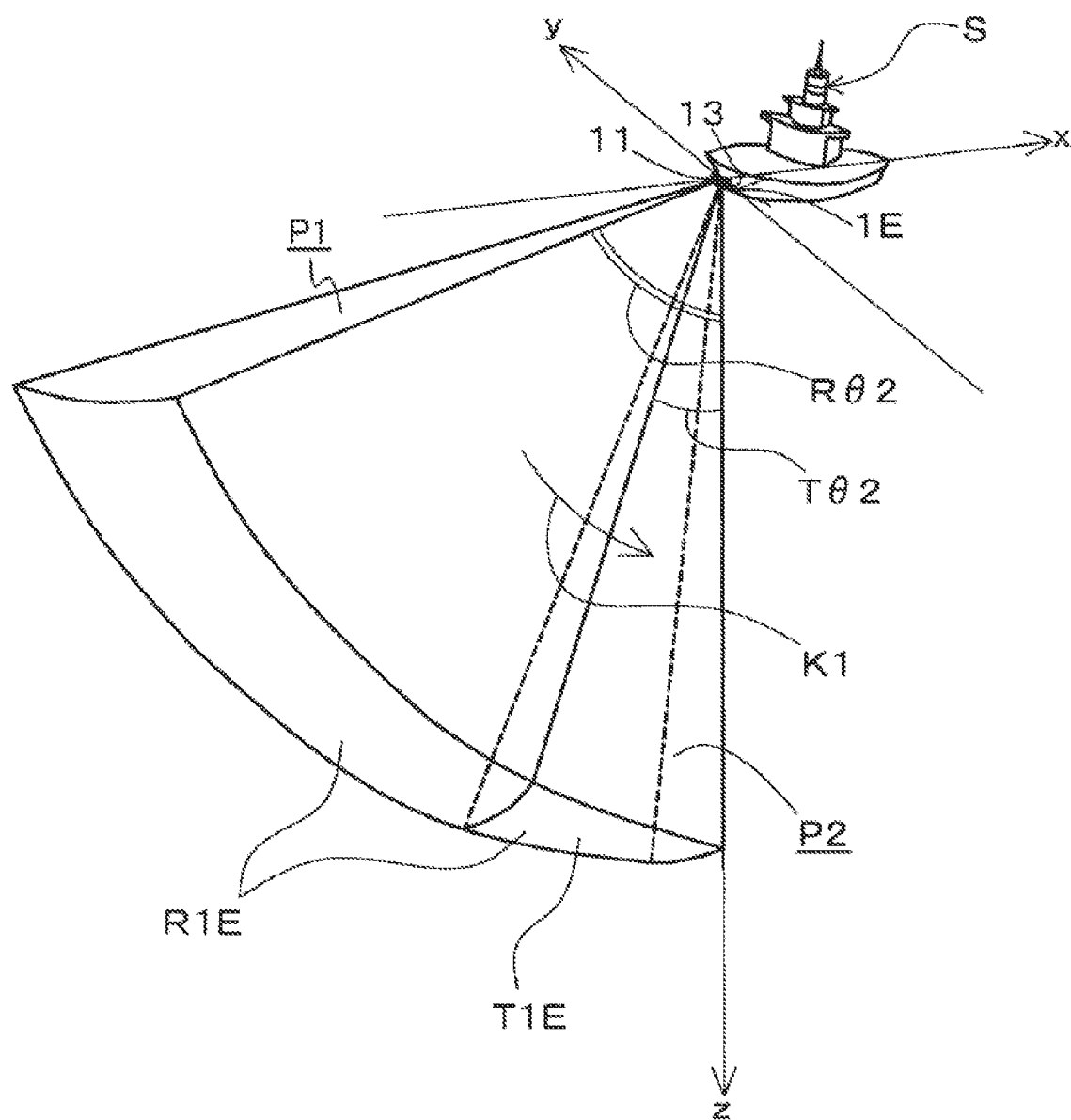
FIG. 21 is a view schematically illustrating an underwater detection apparatus according to a fourth embodiment of the present disclosure.

For example, with reference to FIG. 21 which is a view schematically illustrating an underwater detection apparatus 1E according to a fourth embodiment of the present disclosure, this underwater detection apparatus 1E may be used as the front detection sonar. For example, the underwater detection apparatus 1E may have the configuration same as any of the underwater detection apparatuses 1, 1A, 1C, and 1D. In the fourth embodiment, the underwater detection apparatus 1E may have the configuration same as the underwater detection apparatus 1. A transceiving unit 5 may be installed in the bow of the ship S.

The wave transmitter 11 of the wave transceiving unit 5 may form a transmission fan-shaped space T1E forward of the ship S. Although the transmission fan-shaped space T1E is the same shape as the transmission fan-shaped space T1, the direction to the seabed surface may differ. Moreover, the wave receiver 13 of the wave transceiving unit 5 may receive a signal from a reception fan-shaped space R1E forward of the ship S. Although the reception fan-shaped space R1E is the same shape as the reception fan-shaped space R1, the direction to the seabed surface may differ. In the fourth embodiment, the first plane P1 may be a plane including a horizontal straight line. Moreover, the second plane P2 may be a vertical plane. Also in the fourth embodiment, similar to the first embodiment, the wave transmitter 11 and the wave receiver 13 may be configured so that, in the second plane P2, the second receiving width Rθ2 of the reception fan-shaped space R1E is wider than the second transmitting width Tθ2 of the transmission fan-shaped space T1E, and in the second plane P2, the transmission fan-shaped space T1E is located in the reception fan-shaped space R1E. Moreover, in the underwater detection apparatus 1E, both the wave transmitting surface 11b of the wave transmitter 11 and the wave receiving surface 13b of the wave receiver 13 may be disposed obliquely to a vertical plane, and a direction perpendicular to the wave transmitting surface 11b and a direction perpendicular to the wave receiving surface 13b may not be parallel to each other but may be different directions.

In the fourth embodiment, the transmission fan-shaped space T1E and the reception fan-shaped space R1E may rotate about a horizontal axis extending to the left and right of the ship S (the y-axis illustrated in FIG. 21). As illustrated in FIG. 21, when the reception fan-shaped space R1E is located above the transmission fan-shaped space T1E, the first direction K1 may be a direction about the y-axis from the sea surface to the seabed. On the other hand, when the detection is performed while the reception fan-shaped space R1E is located below the transmission fan-shaped space T1E, the second direction K2 may be a direction about the y-axis from the seabed to the sea surface, and it may be opposite from the first direction K1.

Also in the underwater detection apparatus 1E according to the fourth embodiment, both the speed-up of the updating cycle of the detection result image and the prevention of the reduction in the detection range forward of the ship S can be achieved.

(4) Moreover, in the above embodiments and the above modifications, the echo intensity at each angle about the horizontal axis perpendicular to the rotation axis L1 in the reception fan-shaped spaces R1 and R2 may be calculated by using the delay-and-sum as the beam forming technique in the fan area detection data generating module 36. However, this configuration may be altered. For example, the echo intensity at each angle about the horizontal axis in the reception fan-shaped spaces R1 and R2 may be calculated by using an adaptation beam forming technique, such as the Capon method and the MUSIC method. Therefore, compared with the case where the delay-and-sum is used, an angle resolution in the direction about the horizontal axis in this apparatus can be improved.

(5) In the above embodiments and the above modifications, although the wave transmitters 11 and 12 are each formed in the form of the linear array, the configuration may be altered. For example, by arraying the plurality of wave transmission elements 11a and 12a along an arc, the transmission fan-shaped spaces T1 and T2 can be expanded in φ-direction to detect a larger area, or the source level can be increased while maintaining the sizes of the transmission fan-shaped spaces T1 and T2.

(6) In the above embodiments and the above modifications, although the wave receivers 13 and 14 are each formed in the form of the linear array, the configuration may be altered. For example, by arranging the plurality of wave receiving elements 13a and 14a along an arc, the reception fan-shaped spaces R1 and R2 can be expanded in the φ-direction to detect a larger area.

(7) In the above embodiments and the above modifications, although the wave transmitters 11 and 12, and the wave receivers 13 and 14 are rotated by the single motor 16, the configuration may be altered. For example, the wave transmitters 11 and 12, and the wave receivers 13 and 14 may be rotated by separate motors.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An underwater detection apparatus, comprising:
   a transmission transducer configured to transmit a transmission wave within a given fan-shaped transmission space, the fan-shaped transmission space having a first transmission width in a given first plane and a second transmission width in a second plane perpendicular to the first plane;
   a reception transducer configured to receive, as a reception wave, a reflection wave of the transmission wave within a given fan-shaped reception space, the fan-shaped reception space having a first reception width in the first plane and a second reception width in the second plane, the second reception width being wider than the second transmission width, and in the second plane, the fan-shaped transmission space being within the fan-shaped reception space; and
   a motor configured to rotate the fan-shaped transmission space and the fan-shaped reception space.

2. The underwater detection apparatus of claim 1, wherein:
   when the motor rotates in a given direction, the fan-shaped transmission space is positioned in a front half side of the fan-shaped reception space in the second plane relative to the given direction.

3. The underwater detection apparatus of claim 1, further comprising:
   a controller configured to control the motor to rotate in a given first direction when either performing or not performing the underwater detection.

4. The underwater detection apparatus of claim 1, further comprising:
   a controller configured to control the motor to:
      rotate in a given first direction when performing the underwater detection, and
      rotate in a given second direction, opposite of the first direction, when not performing the underwater detection.

5. The underwater detection apparatus of claim 1, further comprising:
   a direction change mechanism configured to change a direction of the fan-shaped transmission space relative to the fan-shaped reception space in the second plane, wherein
   when the motor changes a rotation direction, the direction change mechanism changes a direction of the fan-shaped transmission space, a position of the fan-shaped transmission space in the second plane being shifted to a position in a back half side of the fan-shaped reception space relative to the rotation direction before the rotation direction is changed.

6. The underwater detection apparatus of claim 2, further comprising:
- a second reception transducer configured to receive, as a reception wave, a reflection wave of the transmission wave within a given second fan-shaped reception space, the second fan-shaped reception space having a third reception width in the first plane and a fourth reception width in the second plane, the fourth reception width being wider than the second transmission width of the fan-shaped transmission space, and in the second plane, the fan-shaped transmission space being within the second fan-shaped reception space, wherein:
- the motor is configured to rotate the fan-shaped transmission space, the fan-shaped reception space and the second fan-shaped reception space; and
- when the motor rotates in the given direction, the fan-shaped transmission space is positioned in a back half side of the second fan-shaped reception space in the second plane relative to the given direction.

7. The underwater detection apparatus of claim 6, further comprising:
- a reception circuitry, connected to the reception transducer and to the second reception transducer, configured to generate a reception signal from the reception wave received by the reception transducer and to generate a second reception signal from the reception wave received by the second reception transducer; and
- processing circuitry configured to generate detection information based on the reception signal and the second reception signal, wherein
- when the motor rotates in a given first direction, the processing circuitry generates the detection information based on the reception signal, and
- when the motor rotates in a second direction, different from the first direction, the processing circuitry generates the detection information based on the second reception signal.

8. The underwater detection apparatus of claim 2, further comprising:
- a second transmission transducer configured to transmit a second transmission wave within a given second fan-shaped transmission space, the second fan-shaped transmission space having a third transmission width in the first plane and a fourth transmission width in the second plane, wherein
- the second reception width of the fan-shaped reception space is wider than the fourth transmission width, and in the second plane, the second fan-shaped transmission space is within the fan-shaped reception space;
- the motor is configured to rotate the fan-shaped transmission space, the fan-shaped reception space and the second fan-shaped transmission space; and
- when the motor rotates in the given direction, the second fan-shaped transmission space is positioned in a back half side of the fan-shaped reception space in the second plane relative to the given direction.

9. The underwater detection apparatus of claim 8, further comprising:
- processing circuitry configured to drive the transmission transducer and the second transmission transducer, wherein
- when the motor rotates in a given first direction, the processing circuitry drives the transmission transducer, and
- when the motor rotates in a second direction, different from the first direction, the processing circuitry drives the second transmission transducer.

10. The underwater detection apparatus of claim 1, wherein:
- when the motor rotates in a given direction, one edge of a pair of edges of the fan-shaped transmission space is positioned on a front edge of the fan-shaped reception space relative to the given direction.

11. The underwater detection apparatus of claim 1, wherein:
- the fan-shaped transmission space is a space in which a power of the transmission wave transmitted by the transmission transducer is equal or higher than half of a maximum power of the transmission wave; and
- the fan-shaped reception space is a space in which a reception power sensitivity of the reception transducer is equal or higher than half of a maximum sensitivity of the reception transducer.

12. The underwater detection apparatus of claim 1, wherein:
- the first plane is a vertical plane; and
- the second plane is a horizontal plane.

13. The underwater detection apparatus of claim 1, wherein:
- the first plane is a plane including a horizontal line; and
- the second plane is a vertical plane.

14. The underwater detection apparatus of claim 1, wherein:
- the motor rotates the fan-shaped transmission space and the fan-shaped reception space about an axis perpendicular to the second plane.

15. The underwater detection apparatus of claim 1, wherein:
- the motor rotates the fan-shaped transmission space and the fan-shaped reception space by rotating the transmission transducer and the reception transducer.

16. The underwater detection apparatus of claim 1, wherein:
- the transmission transducer and the reception transducer are different transducers.

17. The underwater detection apparatus of claim 1, wherein:
- a transmission surface of the transmission transducer is making an oblique angle with a vertical plane;
- a reception surface of the reception transducer is making an oblique angle with a vertical plane; and
- a direction perpendicular to the transmission surface and a direction perpendicular to the reception surface are different directions.

18. An underwater detection method, comprising:
- transmitting a transmission wave within a given fan-shaped transmission space, the fan-shaped transmission space having a first transmission width in a given first plane and a second transmission width in a second plane perpendicular to the first plane;
- receiving, as a reception wave, a reflection wave of the transmission wave within a given fan-shaped reception space, the fan-shaped reception space having a first reception width in the first plane and a second reception width in the second plane, the second reception width being wider than the second transmission width, and in the second plane, the fan-shaped transmission space being within the fan-shaped reception space; and
- rotating the fan-shaped transmission space and the fan-shaped reception space.

* * * * *